US010860227B2

(12) United States Patent
Jin et al.

(10) Patent No.: US 10,860,227 B2
(45) Date of Patent: Dec. 8, 2020

(54) MEMORY CONTROLLER, MEMORY SYSTEM HAVING THE SAME, AND METHOD OF OPERATING THE SAME

(71) Applicant: SK hynix Inc., Gyeonggi-do (KR)

(72) Inventors: Yong Jin, Seoul (KR); Duck Hoi Koo, Gyeonggi-do (KR); Jin Pyo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 21 days.

(21) Appl. No.: 16/020,164

(22) Filed: Jun. 27, 2018

(65) Prior Publication Data
US 2019/0163387 A1 May 30, 2019

(30) Foreign Application Priority Data
Nov. 30, 2017 (KR) .................. 10-2017-0163288

(51) Int. Cl.
| G06F 3/06 | (2006.01) |
| G01P 3/00 | (2006.01) |
| G01K 13/00 | (2006.01) |
| G01H 1/00 | (2006.01) |

(52) U.S. Cl.
CPC .......... G06F 3/0634 (2013.01); G06F 3/0604 (2013.01); G06F 3/0679 (2013.01); *G01H 1/00* (2013.01); *G01K 13/00* (2013.01); *G01P 3/00* (2013.01)

(58) Field of Classification Search
CPC .. G01H 1/00; G01K 13/00; G01P 3/00; G06F 3/0604; G06F 3/0634; G06F 3/0679
See application file for complete search history.

(56) References Cited

U.S. PATENT DOCUMENTS

| 2003/0045977 | A1* | 3/2003 | Sato | G06F 7/00 701/32.3 |
| 2004/0117669 | A1* | 6/2004 | Wilson | G06F 1/206 713/300 |
| 2006/0122805 | A1* | 6/2006 | Coulson | G06F 1/206 702/130 |
| 2012/0253746 | A1* | 10/2012 | Kolar | G06Q 10/10 702/188 |
| 2016/0203049 | A1* | 7/2016 | Kim | G11C 16/12 714/721 |
| 2019/0065388 | A1* | 2/2019 | Christensen | G06F 12/0893 |

FOREIGN PATENT DOCUMENTS

| KR | 1020060088650 | 8/2006 |
| KR | 1020090084213 | 8/2009 |
| KR | 101634242 | 6/2016 |

* cited by examiner

*Primary Examiner* — Zhuo H Li
(74) *Attorney, Agent, or Firm* — IP & T Group LLP

(57) ABSTRACT

Provided herein may be a memory controller, a memory system having the same, and a method of operating the same. The memory controller may include an operating environment determiner configured to determine an operating environment of a memory device based on at least one of surrounding environment-sensing data, and a central processing unit (CPU) configured to determine operating characteristics of the memory device required in the determined operating environment, select a policy depending on the determined operating characteristics, and control an operation of the memory device based on the selected policy.

15 Claims, 18 Drawing Sheets

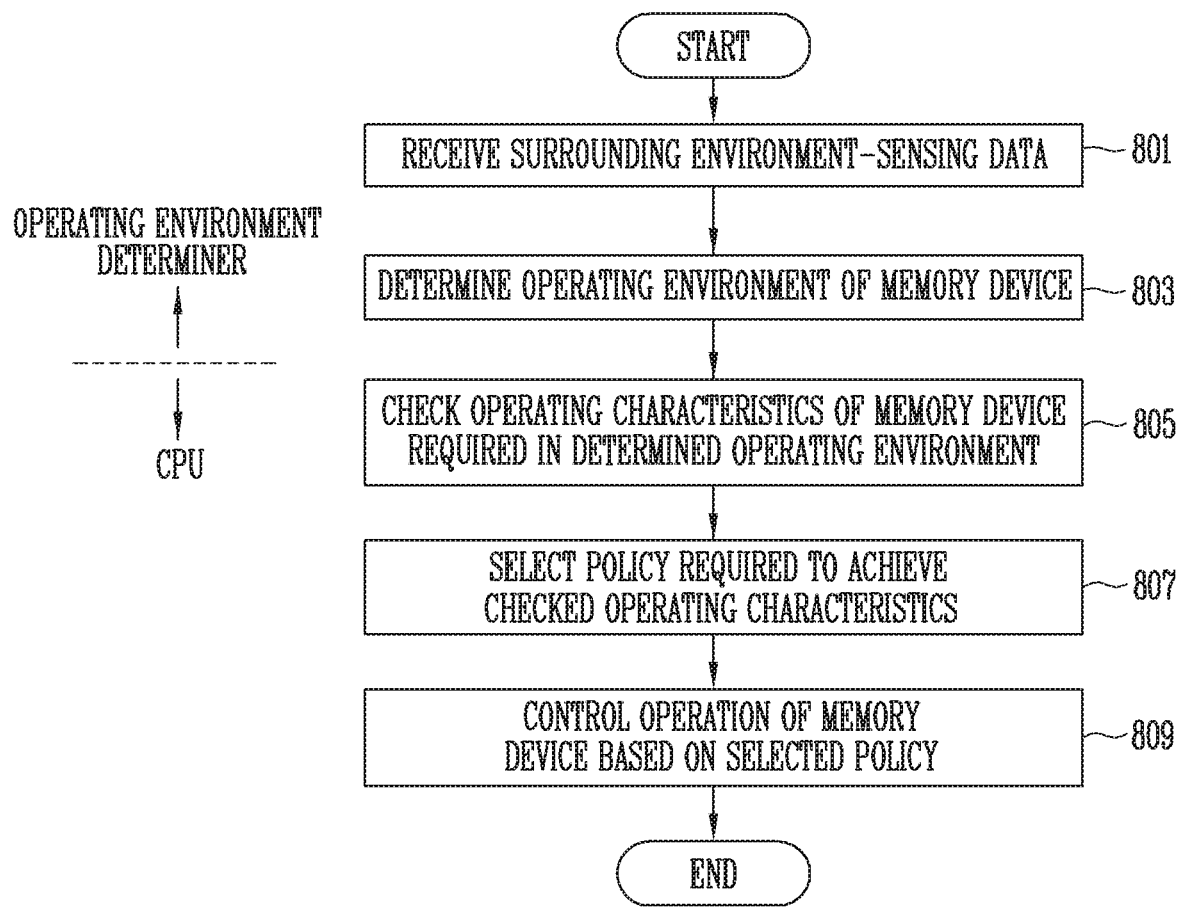

FIG. 9A

OPERATING ENVIRONMENT DETERMINER : FIRST TABLE

| RESULTS OF ANALYSIS OF SURROUNDING ENVIRONMENT-SENSING DATA | OPERATING ENVIRONMENT |
|---|---|
| SET SPEED VALUE < CURRENT SPEED | FIRST OPERATING ENVIRONMENT |
| CURRENT SPEED ≤ SET SPEED VALUE | SECOND OPERATING ENVIRONMENT |

FIG. 9B

CPU: SECOND TABLE

| OPERATING ENVIRONMENT | REQUIRED OPERATING CHARACTERISTICS |
|---|---|
| FIRST OPERATING ENVIRONMENT | HIGH OPERATING SPEED |
| SECOND OPERATING ENVIRONMENT | LOW OPERATING SPEED |

FIG. 9C

CPU: POLICY TABLE

| REQUIRED OPERATING CHARACTERISTICS | PROGRAM MODE | PROGRAM TECHNIQUE (ISPP) | READ VOLTAGE | COMPRESSION OR NON-DATA COMPRESSION | COPY-BACK OR NON-COPY-BACK |
|---|---|---|---|---|---|
| HIGH OPERATING SPEED | SLC MODE | LARGE STEP VOLTAGE HIGH PROGRAM START VOLTAGE | DEFAULT | X | X |
| LOW OPERATING SPEED | MLC MODE | SMALL STEP VOLTAGE LOW PROGRAM START VOLTAGE | DEFAULT | O | O |

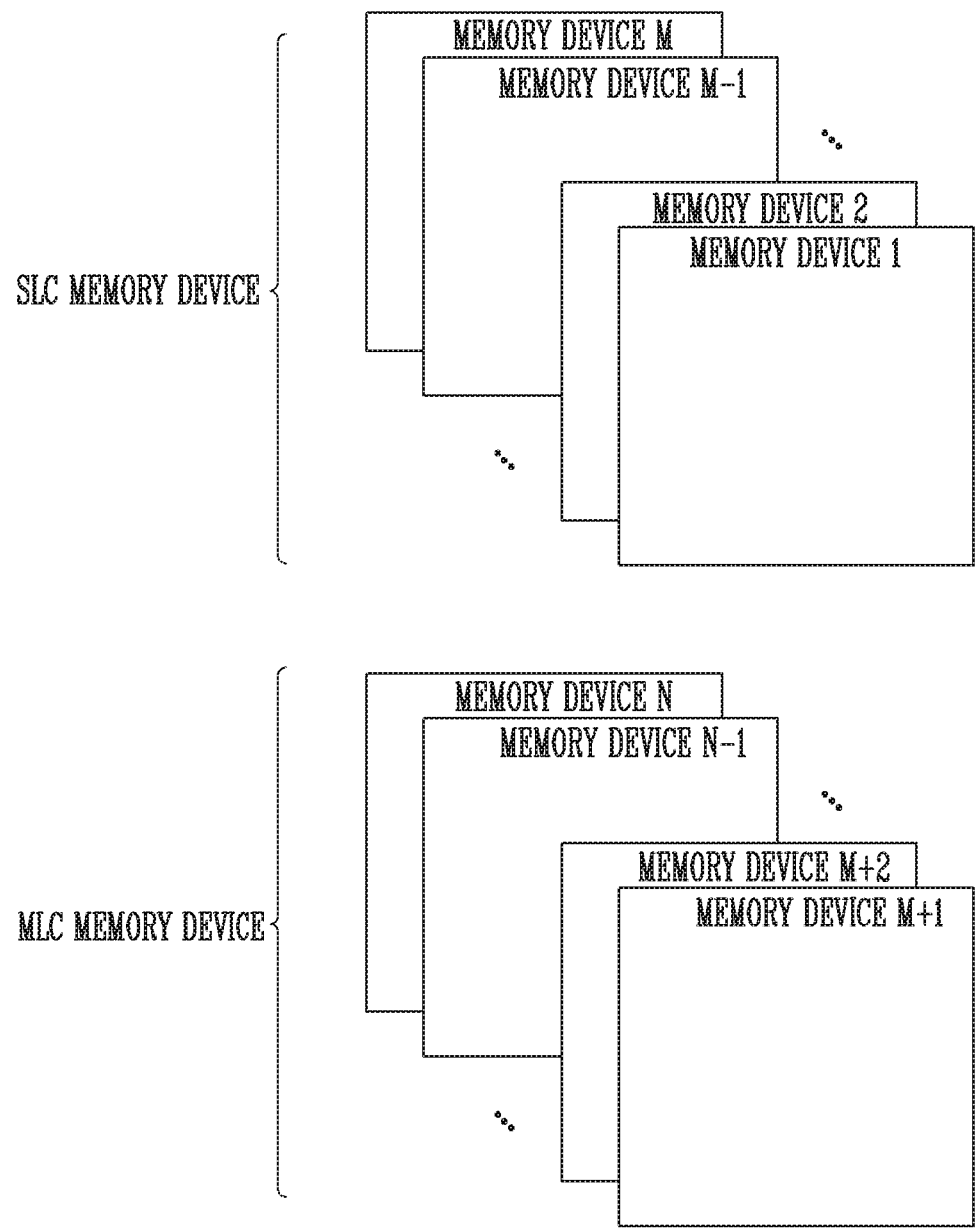

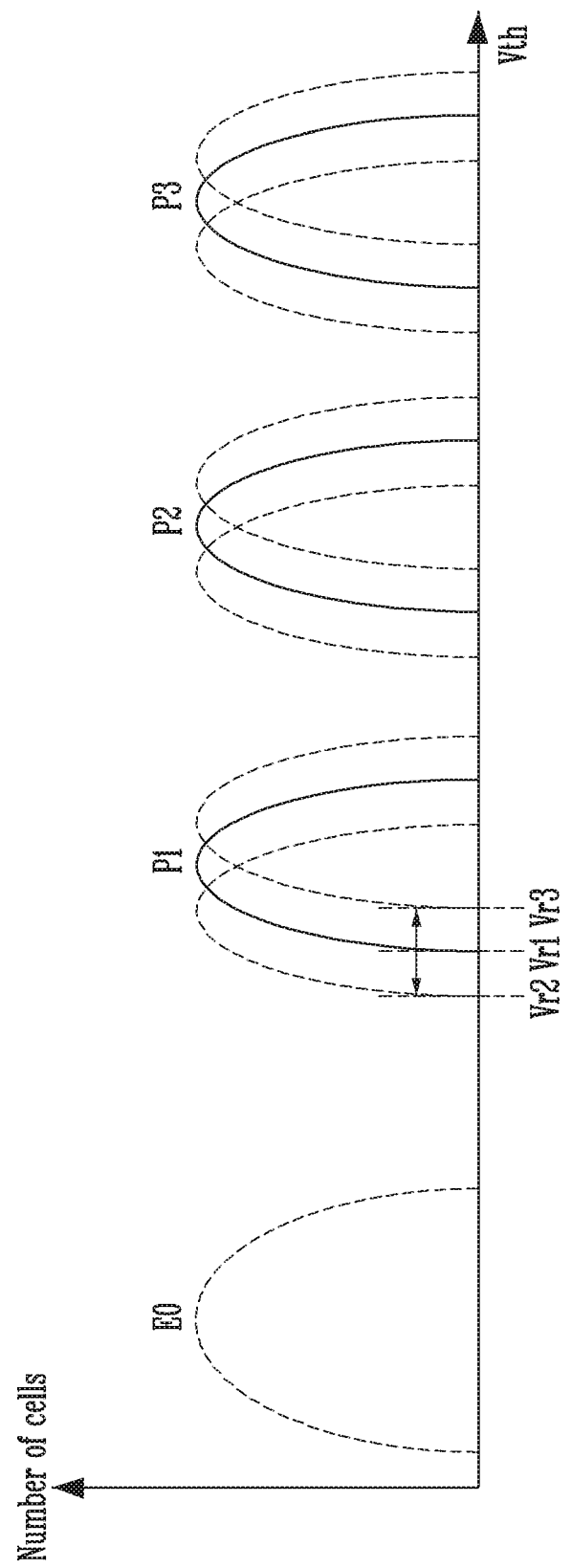

FIG. 13A

OPERATING ENVIRONMENT DETERMINER : FIRST TABLE

| RESULTS OF ANALYSIS OF SURROUNDING ENVIRONMENT–SENSING DATA | OPERATING ENVIRONMENT |
|---|---|
| PREVIOUS SPEED ≤ CURRENT SPEED AND (CURRENT EXTERNAL TEMPERATURE < FIRST SET EXTERNAL TEMPERATURE VALUE OR SECOND SET EXTERNAL TEMPERATURE VALUE < CURRENT EXTERNAL TEMPERATURE) | FIRST OPERATING ENVIRONMENT |
| SET VIBRATION VALUE < CURRENT VIBRATION AND (CURRENT EXTERNAL TEMPERATURE < FIRST SET EXTERNAL TEMPERATURE VALUE OR SECOND SET EXTERNAL TEMPERATURE VALUE < CURRENT EXTERNAL TEMPERATURE) | SECOND OPERATING ENVIRONMENT |
| PREVIOUS SPEED ≤ CURRENT SPEED AND FIRST SET EXTERNAL TEMPERATURE VALUE ≤ CURRENT EXTERNAL TEMPERATURE ≤ SECOND SET EXTERNAL TEMPERATURE VALUE | THIRD OPERATING ENVIRONMENT |
| (CURRENT SPEED = 0 OR CURRENT SPEED < PREVIOUS SPEED) AND CURRENT VIBRATION ≤ SET VIBRATION VALUE | FOURTH OPERATING ENVIRONMENT |

FIG. 13B

CPU: SECOND TABLE

| OPERATING ENVIRONMENT | REQUIRED OPERATING CHARACTERISTICS |
|---|---|
| FIRST OPERATING ENVIRONMENT | HIGH DATA RELIABILITY/HIGH OPERATING SPEED |
| SECOND OPERATING ENVIRONMENT | HIGH DATA RELIABILITY/LOW OPERATING SPEED |
| THIRD OPERATING ENVIRONMENT | LOW DATA RELIABILITY/HIGH OPERATING SPEED |
| FOURTH OPERATING ENVIRONMENT | LOW DATA RELIABILITY/LOW OPERATING SPEED |

FIG. 13C

CPU: POLICY TABLE

| REQUIRED OPERATING CHARACTERISTICS | PROGRAM MODE | PROGRAM TECHNIQUE (ISPP) | READ VOLTAGE | DATA COMPRESSION OR NON-DATA COMPRESSION | COPY-BACK OR NON-COPY-BACK |
|---|---|---|---|---|---|
| HIGH DATA RELIABILITY/ HIGH OPERATING SPEED | SLC MODE | SMALL STEP VOLTAGE SMALL NUMBER OF PROGRAM LOOPS | DEFAULT | X | X |
| HIGH DATA RELIABILITY/ LOW OPERATING SPEED | 2-BIT MLC MODE | SMALL STEP VOLTAGE LARGE NUMBER OF PROGRAM LOOPS | CHANGE | O | O |
| LOW DATA RELIABILITY/ HIGH OPERATING SPEED | 3-BIT MLC MODE | LARGE STEP VOLTAGE HIGH PROGRAM START VOLTAGE SMALL NUMBER OF PROGRAM LOOPS | DEFAULT | X | X |
| LOW DATA RELIABILITY/ LOW OPERATING SPEED | 4-BIT MLC MODE | LARGE STEP VOLTAGE HIGH PROGRAM START VOLTAGE LARGE NUMBER OF PROGRAM LOOPS | DEFAULT | O | O |

MEMORY CONTROLLER, MEMORY SYSTEM HAVING THE SAME, AND METHOD OF OPERATING THE SAME

CROSS-REFERENCE TO RELATED APPLICATION

The present application claims priority under 35 U.S.C. § 119(a) to Korean patent application number 10-2017-0163288 filed on Nov. 30, 2017, the entire disclosure of which is incorporated herein by reference.

BACKGROUND

Field of Invention

Various embodiments of the present disclosure relate to a memory controller, a memory system having the memory controller, and a method of operating the memory controller. More particularly, various embodiments of the present disclosure relate to a memory controller, a memory system having the memory controller, and a method of operating the memory controller, which may control operations of a memory device.

Description of Related Art

Generally, a memory system may include a memory device and a memory controller.

The memory device may store data or output stored data under the control of the memory controller. For example, the memory device may be implemented as a volatile memory device in which stored data is lost when the power supply is interrupted or as a nonvolatile memory device in which stored data is retained even if the power supply is interrupted.

The memory controller may control data communication between a host and the memory device.

The host may be capable of communicating with the memory system using an interface protocol, such as Peripheral Component Interconnect-Express (PCI-E), Advanced Technology Attachment (ATA), Serial ATA (SATA), Parallel ATA (PATA) or Serial Attached SCSI (SAS). Interface protocols between the host and the memory system are not limited to the above-described examples. For example, the host may communicate with the memory system using various interfaces, such as a Universal Serial Bus (USB), a Multi-Media Card (MMC), an Enhanced Small Disk Interface (ESDI), or Integrated Drive Electronics (IDE).

SUMMARY

Various embodiments of the present disclosure are directed to a memory controller, a memory system having the memory controller, and a method of operating the memory controller, which may control the operating characteristics of a memory device depending on various environments.

An embodiment of the present disclosure may provide for a memory controller. The memory controller may include an operating environment determiner configured to determine an operating environment of a memory device based on at least one of surrounding environment-sensing data, and a central processing unit (CPU) configured to determine operating characteristics of the memory device required in the determined operating environment, select a policy depending on the determined operating characteristics, and control an operation of the memory device based on the selected policy.

An embodiment of the present disclosure may provide for a memory system. The memory system may include a memory device configured to store or output data, and a memory controller configured to determine an operating environment of the memory device based on at least one of surrounding environment-sensing data, determine operating characteristics of the memory device required in the determined operating environment, select a policy depending on the determined operating characteristics, and control an operation of the memory device based on the selected policy.

An embodiment of the present disclosure may provide for a method of operating a memory controller. The method may include determining an operating environment of the memory device based on surrounding environment-sensing data of the memory device, determining operating characteristics of the memory device required in the determined operating environment, selecting a policy required to achieve the determined operating characteristics, and controlling an operation of the memory device based on the selected policy.

An embodiment of the present disclosure may provide for a memory system. The memory system may include a memory device disposed in a place, and a memory controller configured to receive surrounding environment-sensing data regarding the place, determine an operating environment of the memory device based on the surrounding environment-sensing data, and control an operation of the memory device based on the determined operating environment.

BRIEF DESCRIPTION OF THE DRAWINGS

FIG. 8 is a flowchart illustrating a method of operating a memory controller according to an embodiment of the present disclosure.

FIGS. 9A to 9C are diagrams for explaining tables according to an embodiment of the present disclosure.

FIG. 10 is a diagram illustrating a memory device to which policies on different program modes are applied according to an embodiment of the present disclosure.

FIG. 12 is a diagram illustrating a read method to which different policies are applied according to an embodiment of the present disclosure.

FIGS. 13A to 13C are diagrams for explaining tables according to an embodiment of the present disclosure.

DETAILED DESCRIPTION

Advantages, features, and methods for achieving the present invention will be described in more detail with reference to embodiments described along with the accompanying drawings. Accordingly, the present disclosure is not limited to the following embodiments but may be embodied in other forms. Rather, these embodiments are provided so that the present disclosure will be thorough and complete, and will fully convey the technical spirit of the disclosure to those skilled in the art. Further, it is noted that reference to "an embodiment" does not necessarily mean only one embodiment, and different references to "an embodiment" are not necessarily to the same embodiment(s).

It will be understood that when an element is referred to as being "coupled" or "connected" to another element, it may be directly coupled or connected to the other element or intervening elements may be present therebetween. In the specification, when an element is referred to as "comprising" or "including" a component, it does not preclude another component but may further include other components unless the context clearly indicates otherwise.

The drawings are not necessarily to scale and, in some instances, proportions may have been exaggerated in order to clearly illustrate features of the embodiments.

The terminology used herein is for the purpose of describing particular embodiments only and is not intended to be limiting of the present invention.

As used herein, singular forms may include the plural forms as well and vice versa, unless the context clearly indicates otherwise.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, embodiments of the present invention will be described with reference to the attached drawings.

Figure 1A:
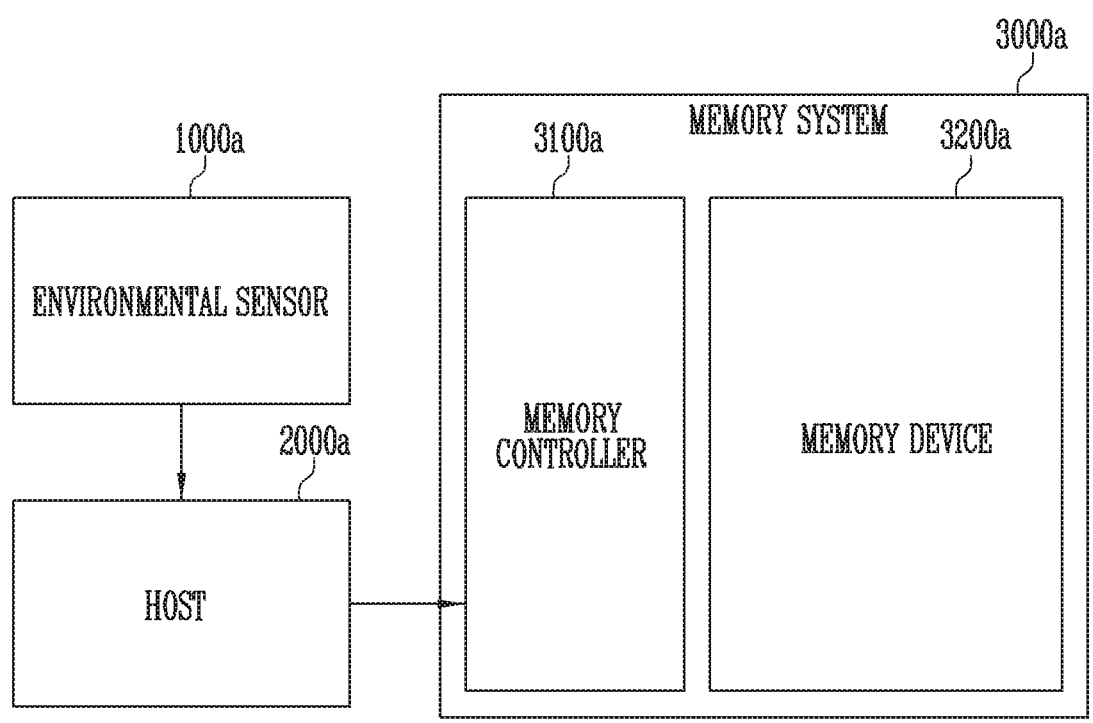
FIG. 1A is a diagram illustrating a memory system according to an embodiment of the present disclosure.

FIG. 1A is a diagram illustrating a memory system 3000a according to an embodiment of the present disclosure.

Referring to FIG. 1A, the memory system 3000a may include a memory device 3200a which stores data and a memory controller 3100a which controls the memory device 3200a under the control of a host 2000a.

The host 2000a may be capable of communicating with the memory system 3000a using an interface protocol, such as Peripheral Component Interconnect-Express (PCI-E), Advanced Technology Attachment (ATA), Serial ATA (SATA), Parallel ATA (PATA) or Serial Attached SCSI (SAS). The interface protocols used between the host 2000a and the memory system 3000a are not limited to the above-described examples, and various interfaces, such as a Universal Serial Bus (USB), a Multi-Media Card (MMC), an Enhanced Small Disk Interface (ESDI), or Integrated Drive Electronics (IDE), may also be used.

The host 2000a may receive surrounding environment-sensing data from at least one environmental sensor 1000a, and transfer the surrounding environment-sensing data to the memory controller 3100a.

The at least one environmental sensor 1000a may collect surrounding environment-sensing data, and may transmit the collected surrounding environment-sensing data to the host 2000a. The memory system 3000a may be used in various environments such as vehicles, factories, or homes, and the at least one environmental sensor 1000a may be arranged near the memory system 3000a to collect surrounding environment-sensing data.

The at least one environmental sensor 1000a may include various types of environmental sensors. For example, the at least one environmental sensor 1000a may include at least one of a temperature sensor, a vibration sensor, and a speed sensor. The at least one environmental sensor 1000a may include a plurality of identical type environmental sensors. For example, the at least one environmental sensor 1000a may include two or more temperature sensors.

The at least one environmental sensor 1000a may transmit the collected surrounding environment-sensing data to the host 2000a either periodically or whenever an event occurs. Here, the occurrence of the event may mean that currently collected surrounding environment-sensing data is different from previously collected surrounding environment-sensing data. For example, when previously collected temperature data indicates 25° C. and currently collected temperature data indicates 30° C., it may be considered that an event has occurred.

The memory controller 3100a may control the overall operation of the memory system 3000a, and may control data exchange between the host 2000a and the memory device 3200a. For example, the memory controller 3100a may convert received Information and store and output the converted information so that commands, addresses, and data may be communicated between the host 2000a and the memory device 3200a. During a program operation, the memory controller 3100a may transmit a command, an address, and data to the memory device 3200a.

The memory controller 3100a may analyze at least one piece of surrounding environment-sensing data received from the host 2000a, and may determine the operating environment of the memory device 3200a based on the result of analysis. The memory controller 3100a may determine the operating environment of a current time of the memory device 3200a by comparing the currently received surrounding environment-sensing data with a set value. For example, the memory controller 3100a may determine the operating environment of a current time of the memory device 3200a by comparing currently received speed data with a set speed value. Here, the set value may be either a value that is measured prior to the currently measured surrounding environment-sensing data or a value set to a default value. The memory controller 3100a may determine the operating environment of a subsequent (i.e., future) time of the memory device 3200a by comparing the currently received surrounding environment-sensing data with previously received surrounding environment-sensing data. In other words, the memory controller 3100a may predict the environment of the memory device 3100a which will operate at a subsequent time. For example, the memory controller 3100a may determine the operating environment of a subsequent time of the memory device 3200a by comparing previously received speed data with currently received speed data. The memory controller 3100a may manage a table that is used to determine the operating environment of the memory device 3200a (hereinafter referred to as a "first table"). The management of a table may mean at least one of generating, storing, modifying, and deleting of the table. The first table may be a table in which the results of analysis of surrounding environment-sensing data are mapped to operating environments. The first table may be stored in the memory controller 3100a or in a separate storage space. In an embodiment, the memory controller 3100a may store a program code that is used to determine the operating environment of the memory device 3200a. The program code may be a program code in which the surrounding environment-sensing data, set values, etc. are used as variables and which outputs a value indicating a specific operating environment as the result of calculation using the corresponding variables.

The memory controller 3100a may check operating characteristics that are required in the determined operating environment. The required operating characteristics may be related to the degree to which data reliability is to be guaranteed or permitted, or the degree to which an operating speed is to be guaranteed or permitted when the memory device 3200a performs an operation. That is, the required operating characteristics may be characteristics related to at least one of data reliability and operating speed which are to be guaranteed or permitted when the memory device 3200a performs an operation. The memory controller 3100a may manage a table that is used to check the required operating characteristics (hereinafter referred to as a "second table"). The second table may be a table in which determined operating environments are mapped to the required operating characteristics. The second table may be stored in the memory controller 3100a or in a separate storage space. In an embodiment, the memory controller 3100a may store a program code that is used to check the required operating characteristics in the second table. The corresponding program code may be a program code in which at least one value indicating a specific operating environment is used as a variable and which outputs at least one value indicating operating characteristics as the result of calculation using the corresponding variable.

The memory controller 3100a may select a policy related to the operation of the memory device 3200a (i.e., an operation policy) depending on the checked operating characteristics. Here, the policy may mean conditions including algorithms, voltage levels, etc. related to various operations that may be performed in the memory device 3200a. According to the selected policy, the memory device 3200a may perform the selected operations in various ways. For example, based on the policy, a program mode, a program technique, a program voltage, a read mode, a read voltage, a voltage application time, etc. may be decided. Here, the program mode or the read mode may include a single-level cell (hereinafter referred to as "SLC") mode or a multi-level cell (hereinafter referred to as "MLC") mode. In the SLC mode, one bit of data may be stored in a single memory cell, while, in the MLC mode, two or more bits of data may be stored in a single memory cell.

The memory controller 3100a may decide on a policy depending on the surrounding environment-sensing data, and the memory device 3200a may be operated based on the policy. For this operation, the memory controller 3100a may manage a table for selecting a policy (hereinafter referred to as a "policy table"). In the policy table, codes corresponding to various policies, respectively, may be stored. Such a policy table may be stored in the memory controller 3100a or in a separate storage space arranged outside the memory controller 3100a. Further, the policy selected by the memory controller 3100a may include policies related to whether to perform data compression and whether to perform a copyback operation, in addition to the program operation and the read operation.

The policy related to the program mode may be a policy for deciding which one of the SLC mode and the MLC mode is to be applied depending on the checked operating characteristics. For example, in an environment in which a high operating speed is required, a program policy for writing a small number of bits per memory cell may be selected, while in an environment in which a relatively low operating speed is required, a program policy for writing a large number of bits per memory cell may be selected. For example, when a first operating speed is required, a policy for applying the SLC mode may be decided on, while when a second operating speed lower than the first operating speed is required, a policy for applying the MLC mode may be decided on. The MLC mode may be classified into various modes depending on the number of bits stored per memory cell. For example, a mode in which two bits of data are stored in a single memory cell may be defined as an MLC mode, a mode in which three bits of data are stored in a single memory cell may be defined as a triple-level cell (TLC) mode, and a mode in which four bits of data are stored in a single memory cell may be defined as a quadruple-level cell (QLC) mode. Therefore, when a third operating speed lower than the second operating speed is required, a policy for applying the TLC mode may be decided on. When a fourth operating speed lower than the third operating speed is required, a policy for applying the QLC mode may be decided on. Furthermore, the policy related to the program mode may prescribe that, as higher data reliability is required, a program mode having a smaller number of information bits per cell is to be applied. For example, when data reliability at a first level is required as the policy related to the program mode, the SLC mode may be applied. When data reliability at a second level lower than the first level is required, the MLC mode may be applied. When data reliability at a third level lower than the second level is required, the TLC mode may be applied. When data reliability at a fourth level lower than the third level is required, the QLC mode may be applied.

Various program operation conditions may be decided based on the policy related to the program technique. For example, in an Incremental Step Pulse Programming (ISPP) operation in which a program voltage is Increased by a step voltage, conditions corresponding to one or more of a step voltage, a program start voltage, and the number of program loops may be adjusted depending on the policy related to the program technique. For example, in the policy related to the program technique, as higher data reliability is required, a smaller step voltage may be applied, whereas as lower data reliability is required, a larger step voltage may be applied. Further, as higher data reliability is required, a lower program start voltage may be applied, whereas as lower data reliability is required, a higher program start voltage may be applied. Also, in the policy related to the program technique, the number of program loops may be applied according to the operating speed. For example, when a second operating speed higher than a first operating speed is required, a smaller number of program loops may be applied compared to a case where the first operating speed is required, depending on the policy related to the program technique.

In the policy related to the read voltage, whether to apply a default read voltage or to apply a changed read voltage may be determined. For example, the policy related to the read voltage may be set when high data reliability and low operating speed are required, and whether to apply a default read voltage or to apply a changed read voltage may be determined depending on the policy related to the read voltage.

The policy related to whether to perform data compression may be a policy for prescribing whether to perform data compression in the checked operating characteristics. For example, the policy related to whether to perform data compression may prescribe that, when a first operating speed is required, data compression is not to be performed, and that, when a second operating speed lower than the first operating speed is required, data compression is to be performed.

The policy related to whether to perform a copy-back operation may be a policy for prescribing whether to perform a copy-back operation in the checked operating characteristics. For example, the policy related to whether to perform a copy-back operation may prescribe that, when a first operating speed is required, the copy-back operation is not to be performed, and that, when a second operating speed lower than the first operating speed is required, the copy-back operation is to be performed.

The memory controller 3100a may control the operation of the memory device 3200a based on the selected policy. For example, the memory controller 3100a may generate a command and an address based on the selected policy, and may transmit the generated command and address to the memory device 3200a.

The memory device 3200a may perform at least one of a program operation, a read operation, an erase operation, a data compression operation, and a copy-back operation under the control of the memory controller 3100a. The memory device 3200a may be implemented as a volatile memory device in which stored data is lost when the power supply is interrupted or as a nonvolatile memory device in which stored data is retained even if the power supply is interrupted. In the embodiments which will be described below, a flash memory included in the nonvolatile memory device is described by way of example. During a program operation, the memory device 3200a may program data or output stored data based on a command and an address.

Figure 1B:
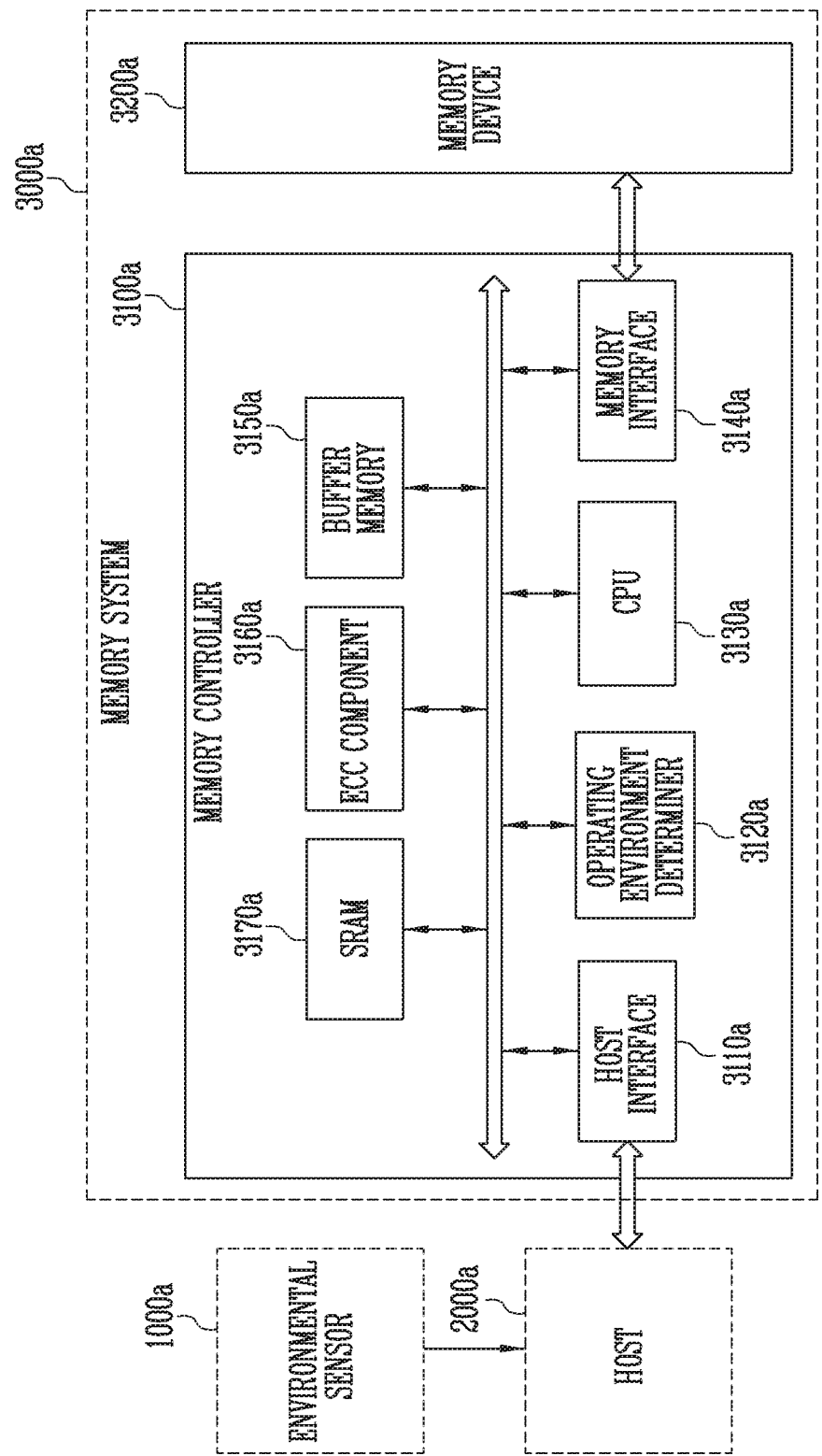
FIG. 1B is a diagram illustrating a memory controller according to an embodiment of the present disclosure.

FIG. 1B is a diagram illustrating a memory controller according to an embodiment of the present disclosure, for example, a diagram for explaining the memory controller 3100a illustrated in FIG. 1A.

Referring to FIG. 1B, the memory controller 3100a may include a host interface 3110a, an operating environment determiner 3120a, a Central Processing Unit (CPU) 3130a, a memory interface 3140a, a buffer memory 3150a, an Error Correcting Code (ECC) component 3160a, and a Static Random-Access Memory (SRAM) 3170a. The above-described host interface 3110a, operating environment determiner 3120a, memory Interface 3140a, buffer memory 3150a, ECC component 3160a, and SRAM 3170a may be controlled by the CPU 3130a.

The host interface 3110a may perform data exchange with a host 2000a using a communication protocol. The host interface 3110a may transfer at least one piece of surrounding environment-sensing data received from the host 2000a to the operating environment determiner 3120a.

The operating environment determiner 3120a may analyze the at least one piece of surrounding environment-sensing data, received from the host interface 3110a, and may then determine the operating environment of the memory device 3200a. The operating environment determiner 3120a may determine the operating environment of a current time of the memory device 3200a by comparing the currently received surrounding environment-sensing data with a set value. For example, the operating environment determiner 3120a may determine the operating environment of a current time of the memory device 3200a by comparing currently received speed data with a set speed value. The operating environment determiner 3120a may determine the operating environment of a subsequent (i.e., future) time of the memory device 3200a by comparing the currently received surrounding environment-sensing data with previously received surrounding environment-sensing data. For example, the operating environment determiner 3120a may determine the operating environment of a subsequent time of the memory device 3200a by comparing previously received speed data with currently received speed data. The operating environment determiner 3120a may manage a first table that is used to determine the operating environment of the memory device 3200a. The management of a table may mean at least one of generating, storing, modifying, and deleting of the table. The first table may be a table in which the results of analysis of surrounding environment-sensing data are mapped to operating environments. The first table may be stored in the operating environment determiner 3120a or in a separate storage space. In an embodiment, the operating environment determiner 3120a may store a program code that is used to determine the operating environment of the memory device 3200a. The program code may be a program code in which the surrounding environment-sensing data, set values, etc. are used as variables and which outputs a value indicating a specific operating environment as the result of calculation using the corresponding variables.

The operating environment determiner 3120a may transmit information about the determined operating environment to the CPU 3130a.

The CPU 3130a may perform various types of calculations or generate commands and addresses so as to control the memory device 3200a. For example, the CPU 3130a may generate various commands required for a program operation, a read operation, an erase operation, a data compression operation, and copy-back operations.

The CPU 3130a may be notified of the operating environment determined by the operating environment determiner 3120a, and may perform calculation corresponding to the determined operating environment.

The CPU 3130a may check operating characteristics that are required in the determined operating environment. The operating characteristics required in the determined operating environment may be related to the degree to which data reliability is to be guaranteed or permitted, or the degree to which an operating speed is to be guaranteed or permitted when the memory device 3200a performs an operation. That is, the required operating characteristics may be characteristics related to at least one of data reliability and operating speed which are to be guaranteed of permitted when the memory device 3200a performs an operation. The CPU 3130a may manage a second table that is used to check the required operating characteristics. The second table may be a table in which determined operating environments are mapped to the required operating characteristics. The second table may be stored in the SRAM 3170a or in a separate storage space arranged outside the memory controller 3100a. In an embodiment, the CPU 3130a may store a program code used to check the required operating characteristics. The corresponding program code may be a program code in which at least one value indicating a specific operating environment is used as a variable and which outputs at least one value indicating operating characteristics as the result of calculation using the corresponding variable.

The CPU 3130a may select a policy related to the operation of the memory device 3200a depending on the checked operating characteristics. Here, the policy may mean conditions including algorithms, voltage levels, etc. related to various operations that may be performed in the memory device 3200a. The CPU 3130a may manage a policy table that is used to select the policy. The policy table may be a table in which at least one policy required to achieve the checked operating characteristics is mapped to the operating characteristics. The policy table may be stored in the CPU 3130a or in a separate storage space. For example, the policy may be a policy related to whether to perform data compression and whether to perform a copy-back operation, in addition to a program operation and a read operation.

The CPU 3130a may control the operation of the memory device 3200a based on the selected policy. For example, the CPU 3130a may generate a command and an address based on the selected policy, and may transmit the generated command and address to the memory device 3200a.

The memory interface 3140a may communicate with the memory device 3200a using a communication protocol.

The buffer memory 3150a may temporarily store data while the memory controller 3100a controls the memory device 3200a. For example, until the program operation is completed, data received from the host 2000a may be temporarily stored in the buffer memory 3150a. Further, during a read operation, data read from the memory device 3200a may be temporarily stored in the buffer memory 3150a.

The ECC component 3160a may detect an error of data and correct the detected error during a program operation or a read operation.

The SRAM 3170a may be used as a storage unit which stores various types of information required for the operation of the memory controller 3100a. The SRAM 3170a may store a plurality of tables. For example, the SRAM 3170a may include a mapping table in which logical addresses are mapped to physical addresses and a second table that is used to check the operating characteristics of the memory device 3200a.

Figure 2A:
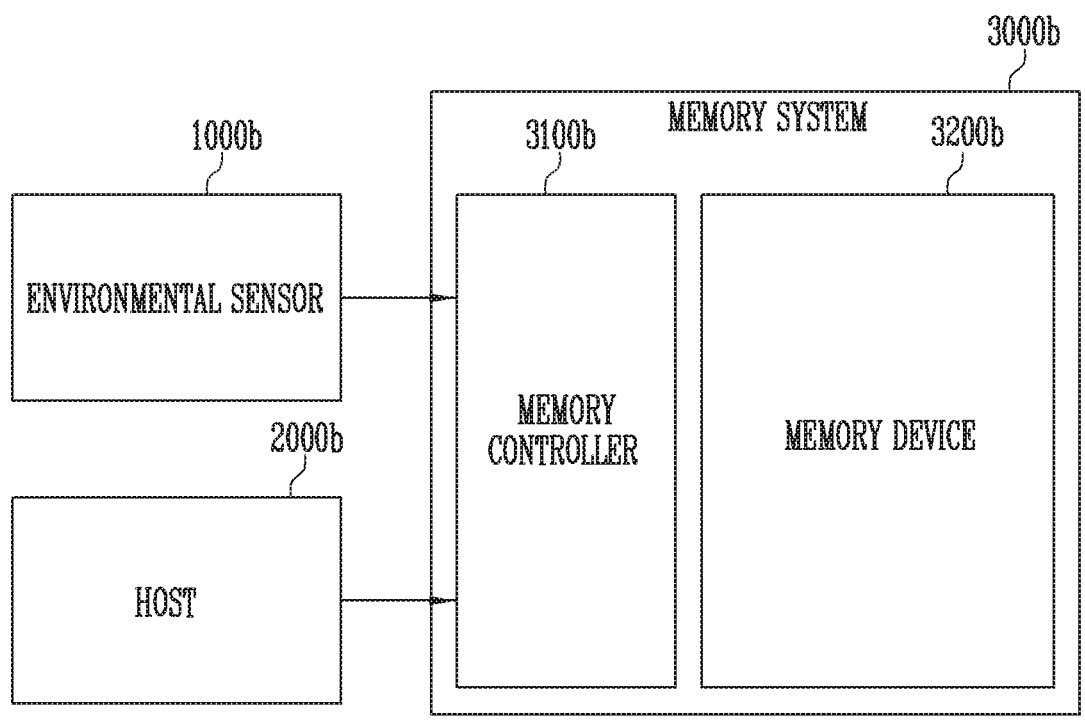
FIG. 2A is a diagram illustrating a memory system according to an embodiment of the present disclosure.

FIG. 2A is a diagram illustrating a memory system 3000b according to an embodiment of the present disclosure.

In an embodiment to be described with reference to FIG. 2A, overlapping descriptions of the embodiment, described above with reference to FIG. 1A, will be omitted.

Referring to FIG. 2A, the memory system 3000b may include a memory device 3200b which stores data, and a memory controller 3100b which controls the memory device 3200b under the control of a host 2000b.

At least one environmental sensor 1000b may collect surrounding environment-sensing data, and may transmit the collected surrounding environment-sensing data to the memory controller 3100b.

The memory controller 3100b may receive at least one piece of surrounding environment-sensing data from the at least one environmental sensor 1000b. The memory controller 3100b may determine the operating environment of the memory device 3200b by analyzing the at least one piece of surrounding environment-sensing data received from the at least one environmental sensor 1000b. Based on the analyzing results, the memory controller 3100b may check operating characteristics required in the determined operating environment, select a policy corresponding to the checked operating characteristics, and then apply the selected policy to control the operation of the memory device 3200b.

The configuration of the present embodiment of FIG. 2A may be substantially identical to that of the embodiment described above with reference to FIG. 1A, except that surrounding environment-sensing data is directly transmitted to the memory controller 3100b without passing through the host 2000b.

Figure 2B:
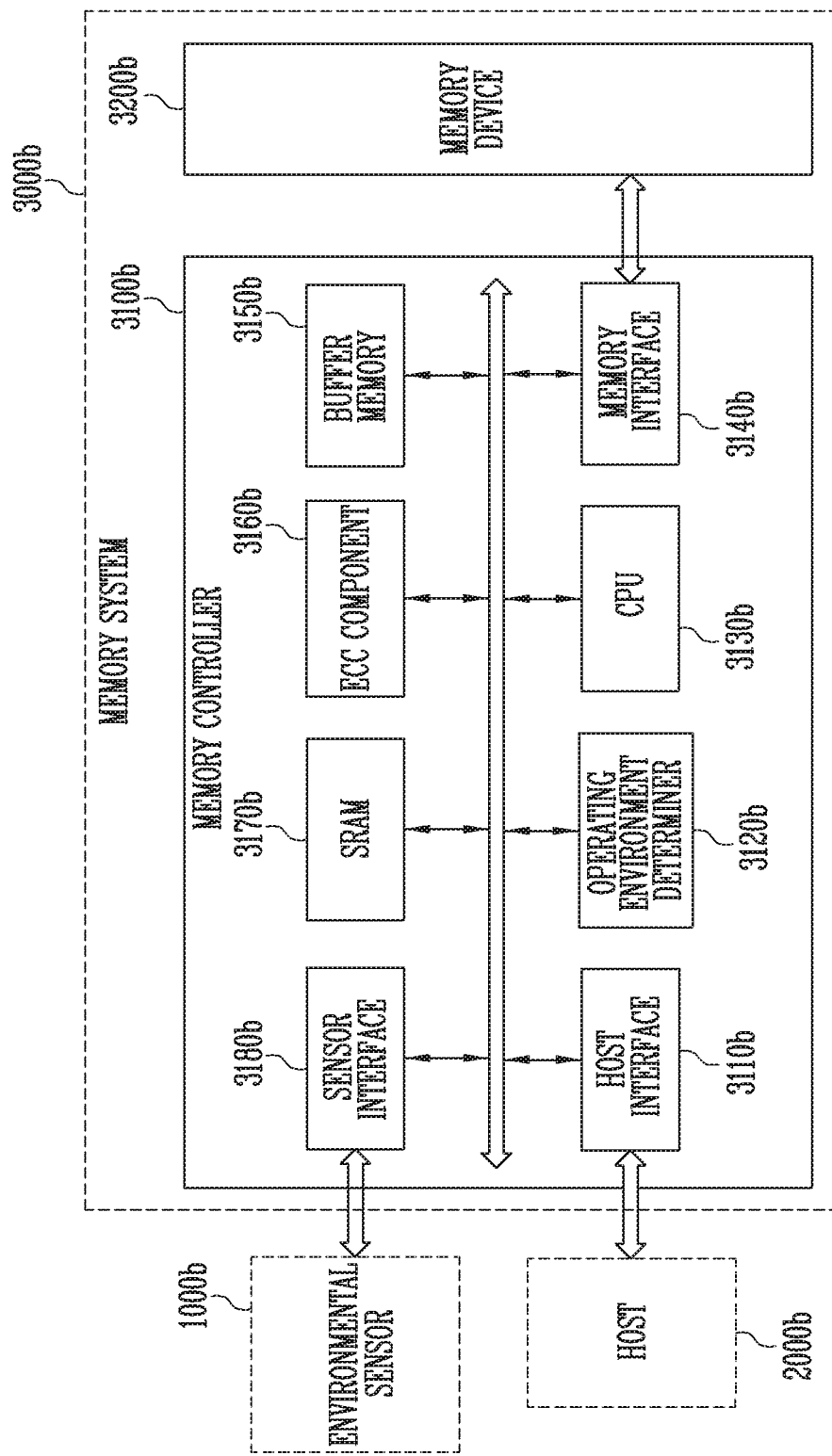
FIG. 2B is a diagram illustrating a memory controller according to an embodiment of the present disclosure.

FIG. 2B is a diagram illustrating a memory controller according to an embodiment of the present disclosure, for example, a diagram for explaining the memory controller 3100b illustrated in FIG. 2A.

In an embodiment to be described with reference to FIG. 2B, overlapping descriptions of the embodiment, described above with reference to FIG. 1B, will be omitted.

Referring to FIG. 2B, the memory controller 3100b may include a host interface 3110b, an operating environment determiner 3120b, a Central Processing Unit (CPU) 3130b, a memory interface 3140b, a buffer memory 3150b, an Error Correcting Code (ECC) component 3160b, an Static Random-Access Memory (SRAM) 3170b, and a sensor interface 3180b. In an embodiment, at least one of the elements illustrated in FIG. 2B may be omitted.

The sensor interface 3180b may receive at least one piece of surrounding environment-sensing data from at least one environmental sensor 1000b. The sensor interface 3180b may transfer the at least one piece of surrounding environment-sensing data to the operating environment determiner 3120b. The sensor interface 3180b may communicate with the at least one environmental sensor 1000b using any of various types of wired and/or wireless interface protocols.

The operating environment determiner 3120b may receive at least one piece of surrounding environment-sensing data from the sensor interface 3180b. The operating environment determiner 3120b may determine the operating environment of the memory device 3200b by analyzing the at least one piece of surrounding environment-sensing data from the sensor interface 3180b. The operating environment determiner 3120b may notify the CPU 3130b of the determined operating environment.

The configuration of the present embodiment of FIG. 2B may be substantially identical to that of the embodiment described above with reference to FIG. 1B, except that surrounding environment-sensing data is received through the sensor interface 3180b without passing through the host interface 3110b.

Figure 3:
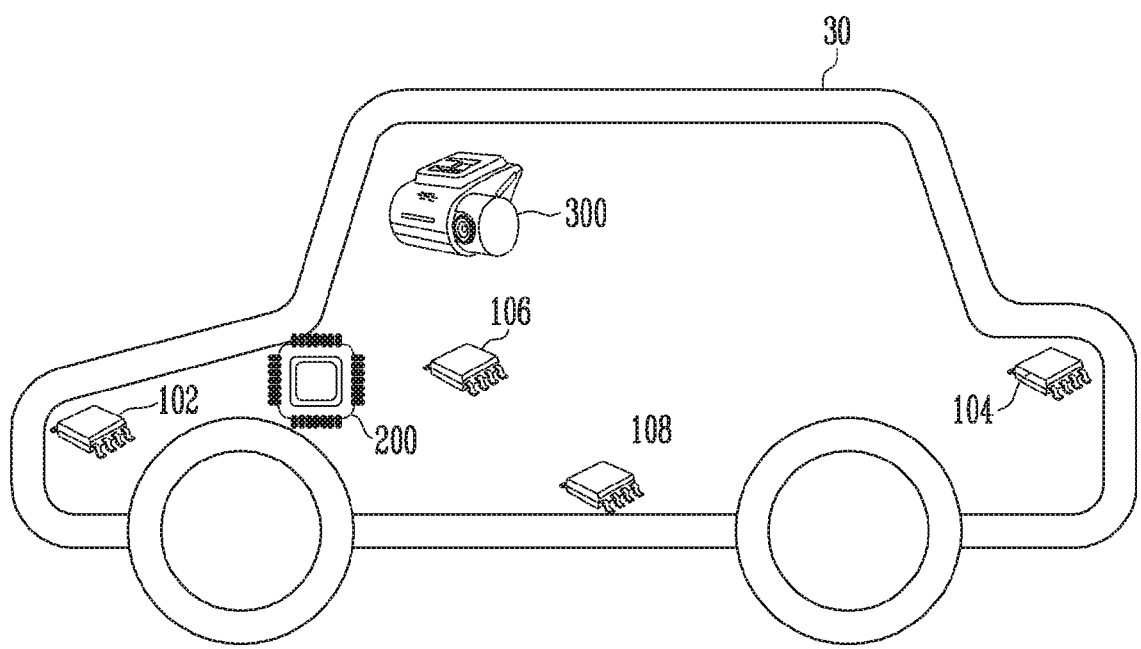
FIG. 3 is a diagram illustrating an environment of a memory system to which embodiments of the present disclosure are applicable.

FIG. 3 is an example diagram for explaining an environment of a memory system to which embodiments of the present disclosure are applicable.

In FIG. 3, an example of a case where the embodiments of the present disclosure are applied to a vehicle 30 is illustrated, but the embodiments of the present disclosure may also be applied to various environments, such as factories and homes, as well as vehicles.

Referring to FIG. 3, a memory system may be installed in, for example, a black box 300 disposed in the vehicle 30, and may store captured images by the black box 300.

Environmental sensors 102, 104, 106, and 108 may be mounted inside or outside the vehicle 30, and may then collect surrounding environment-sensing data. The environmental sensors 102, 104, 106, and 108 may collect various types of surrounding environment-sensing data. For example, the environmental sensor 102 may be a temperature sensor for collecting indoor temperature data, the environmental sensor 104 may a temperature sensor for collecting outdoor temperature data, the environmental sensor 106 may be a speed sensor for collecting speed data, and the environmental sensor 108 may be a vibration sensor for collecting vibration data. The collection of the surrounding environment-sensing data may be periodically performed.

The environmental sensors 102, 104, 106, and 108 may directly transmit the collected surrounding environment-sensing data to the memory system. In accordance with an embodiment, the environmental sensors 102, 104, 106, and 108 may transmit the collected surrounding environment-sensing data to the memory system through a Micro Controller Unit (MCU) 200, which is Installed in the vehicle 30 to control the overall operation of the vehicle 30. Here, the MCU 200 may be a host, which has been described above with reference to FIGS. 1A, 1B, 2A, and 2B.

Figure 4:
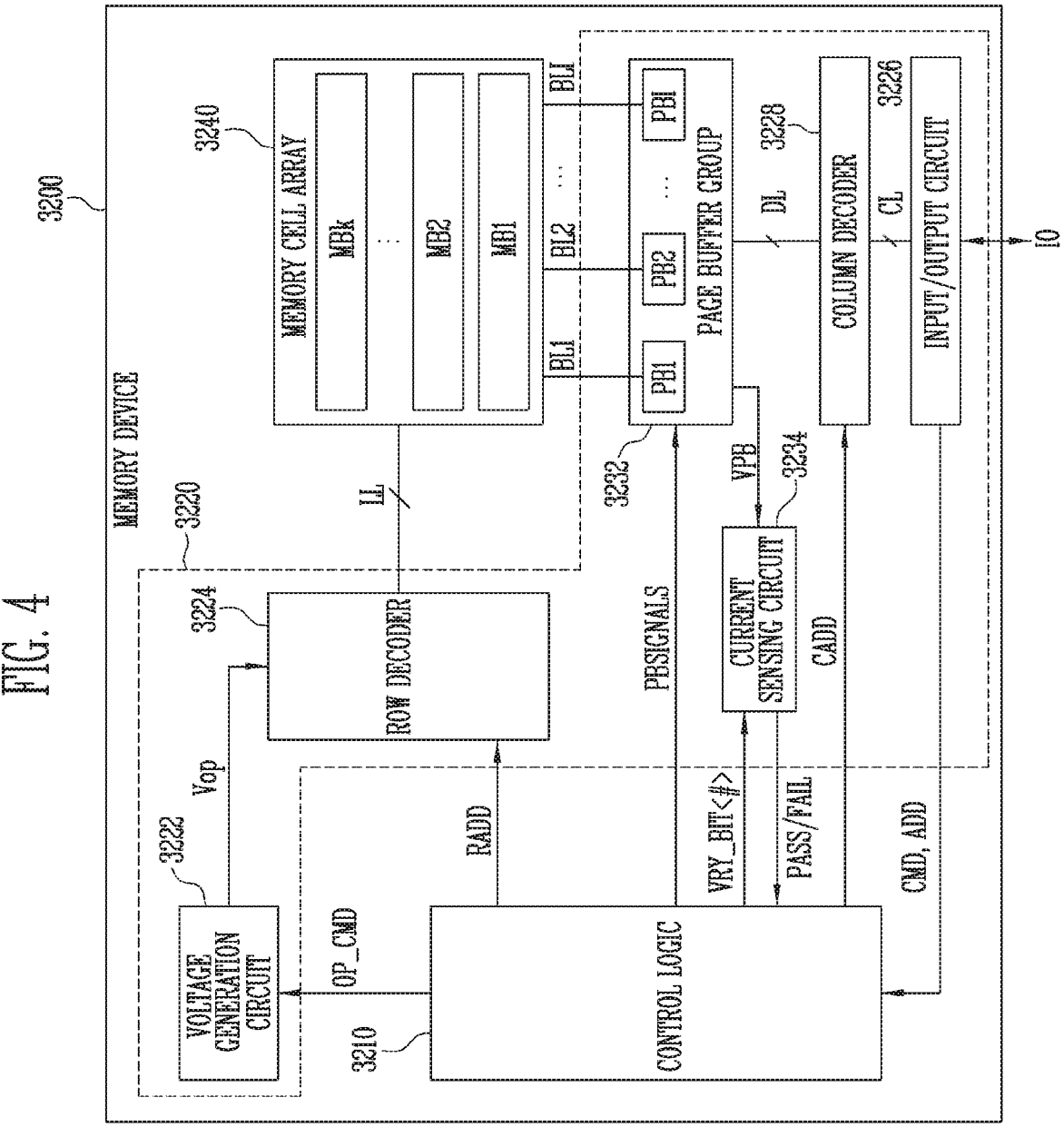
FIG. 4 is a diagram illustrating in detail a memory device according to an embodiment of the present disclosure.

FIG. 4 is a diagram illustrating a memory device 3200 according to an embodiment of the present disclosure. The memory device 3200 illustrated in FIG. 4 may be applied to the memory system illustrated in FIGS. 1A, 1B, 2A, and 2B.

The memory device 3200 may include a control logic 3210, a peripheral circuit 3220, and a memory cell array 3240. The peripheral circuit 3220 may include a voltage generation circuit 3222, a row decoder 3224, an input/output circuit 3226, a column decoder 3228, a page buffer group 3232, and a current sensing circuit 3234.

The control logic 3210 may control the peripheral circuit 3220 under the control of a memory controller, for example, the memory controller 3100a illustrated in FIG. 1B or the memory controller 3100b illustrated in FIG. 2B. The control logic 3210 may control the peripheral circuit 3220 in response to a command CMD and an address ADD that are received from the memory controller through the input/output circuit 3226. For example, the control logic 3210 may output an operation signal OP_CMD, a row address RADD, page buffer control signals PBSIGNALS, and an enable bit VRY_BIT<#> in response to the command CMD and the address ADD. The control logic 3210 may determine whether a verify operation has passed or failed in response to a pass or fail signal PASS or FAIL received from the current sensing circuit 3234.

The peripheral circuit 3220 may perform a program operation of storing data in the memory cell array 3240, a read operation of outputting data stored in the memory cell array 3240, and an erase operation of erasing data stored in the memory cell array 3240, under the control of the control logic 3210. Further, the peripheral circuit 3220 may perform a data compression operation of reducing data capacity using parity data, or a copy-back operation of copying data of a memory block to another memory block in the memory cell array 3240.

The voltage generation circuit 3222 may generate various operating voltages Vop used for the program, read, and/or erase operations in response to the operation signal OP_CMD received from the control logic 3210. For example, the voltage generation circuit 3222 may generate a program voltage, a verify voltage, a pass voltage, a compensation program voltage, a read voltage, an erase voltage, a turn-on voltage, etc.

The row decoder 3224 may transfer the operating voltages Vop to local lines LL that are coupled to a memory block selected from among memory blocks included in the memory cell array 3240 in response to the row address RADD received from the control logic 3210. The local lines LL may include local word lines, local drain select lines, and local source select lines. In addition, the local lines LL may include various lines, such as source lines, coupled to memory blocks.

The input/output circuit 3226 may transfer the command CMD and the address ADD, received from the memory controller through input/output (IO) lines, to the control logic 3210, or may exchange data with the column decoder 3228.

The column decoder 3228 may transfer data between the input/output circuit 3226 and the page buffer group 3232 in response to a column address CADD received from the control logic 3210. For example, the column decoder 3228 may exchange data with the page buffers PB1 to PBI through data lines DL or may exchange data with the input/output circuit 3226 through column lines CL.

The page buffer group 3232 may be coupled to the bit lines BL1 to BLI that are coupled in common to the memory blocks included in the memory cell array 3240. The page buffer group 3232 may include a plurality of page buffers PB1 to PBI coupled to the bit lines BL1 to BLI, respectively. For example, a single page buffer may be coupled to each bit line. The page buffers PB1 to PBI may be operated in response to the page buffer control signals PBSIGNALS received from the control logic 3210. For example, during a program operation, the page buffers PB1 to PBI may temporarily store program data received from the memory controller, and may control voltages to be applied to the bit lines BL1 to BLI based on the program data. Also, during a read operation, the page buffers PB1 to PBI may temporarily store data received through the bit lines BL1 to BLI or may sense voltages or currents of the bit lines BL1 to BLI. During a read or a verify operation, the current sensing circuit 3234 may generate a reference current in response to the enable bit VRY_BIT<#> received from the control logic 3210, and may compare a reference voltage, generated by the reference current, with a sensing voltage VPB, received from the page buffer group 3232, and then output a pass signal PASS or a fail signal FAIL.

The memory cell array 3240 may include a plurality of memory blocks MB1 to MBk which store data. In the memory blocks MB1 to MBk, user data and various types of information required for the operation of the memory device 3200 may be stored. The memory blocks MB1 to MBk may each be implemented as a two-dimensional (2D) structure or a three-dimensional (3D) structure, and may be equally configured.

Figure 5:
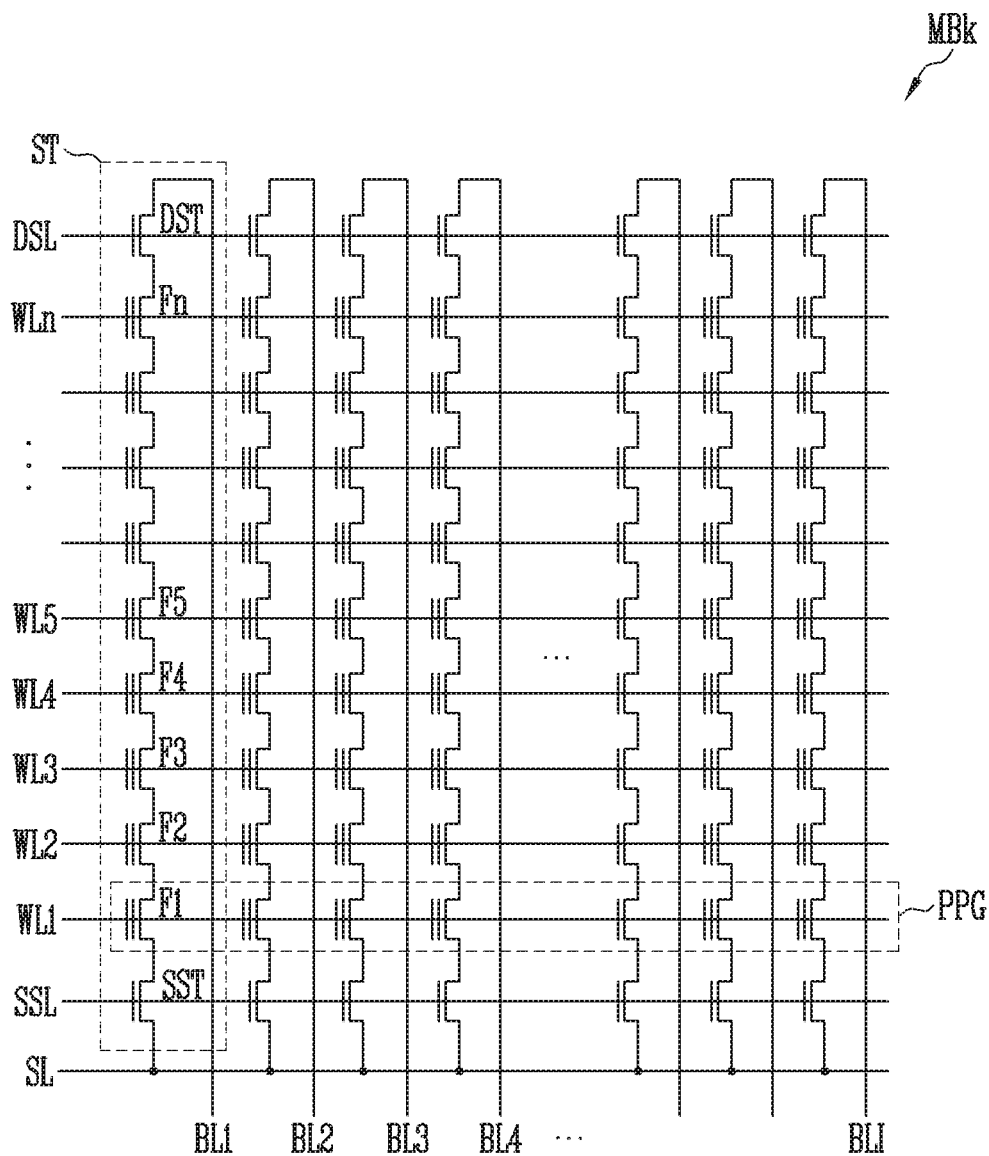
FIG. 5 is a diagram illustrating a memory block having a 2D structure.

FIG. 5 is a diagram illustrating a memory block having a 2D structure.

For convenience, any one memory block MBk of a plurality of memory blocks MB1 to MBk included in a memory cell array 3240 described in FIG. 4 is Illustrated in FIG. 5.

The memory block MBk may include a plurality of cell strings ST coupled between bit lines BL1 to BLI and a source line SL. The cell strings ST may be coupled to the bit lines BL1 to BLI, respectively, and may be coupled in common to the source line SL. Since the cell strings ST may have a similar structure, the cell string ST coupled to the first bit line BL1 will be described below by way of example.

The cell string ST may include a source select transistor SST, first to n-th memory cells F1 to Fn (where n is a positive integer), and a drain select transistor DST coupled in series between the source line SL and the first bit line BL1. The number of source select transistors SST and the number of drain select transistors DST are not limited to specific numbers illustrated in FIG. 5.

The source select transistor SST may be coupled between the source line SL and the first memory cell F1. The first to n-th memory cells F1 to Fn may be coupled in series between the source select transistor SST and the drain select transistor DST. The drain select transistor DST may be coupled between the n-th memory cell Fn and the first bit line BL1. Although not illustrated in the drawing, dummy cells may be further coupled between the memory cells F1 to Fn or between the source select transistor SST and the drain select transistor DST.

The gates of the source select transistors SST included in respective cell strings ST may be coupled to a source select line SSL. The gates of the first to n-th memory cells F1 to Fn may be coupled to first to n-th word lines WL1 to WLn, respectively. The gates of the drain select transistors DST may be coupled to a drain select line DSL. Here, a group of memory cells coupled to each of the word lines WL1 to WLn may be referred to as a "physical page (PPG)". For example, a group of first memory cells F1 coupled to the first word line WL1, among the memory cells F1 to Fn included in different cell strings ST, may be a single physical page PPG. When a multi-level cell (MLC) scheme is used, a plurality of logical pages may be included in a single physical page PPG.

Figure 6:
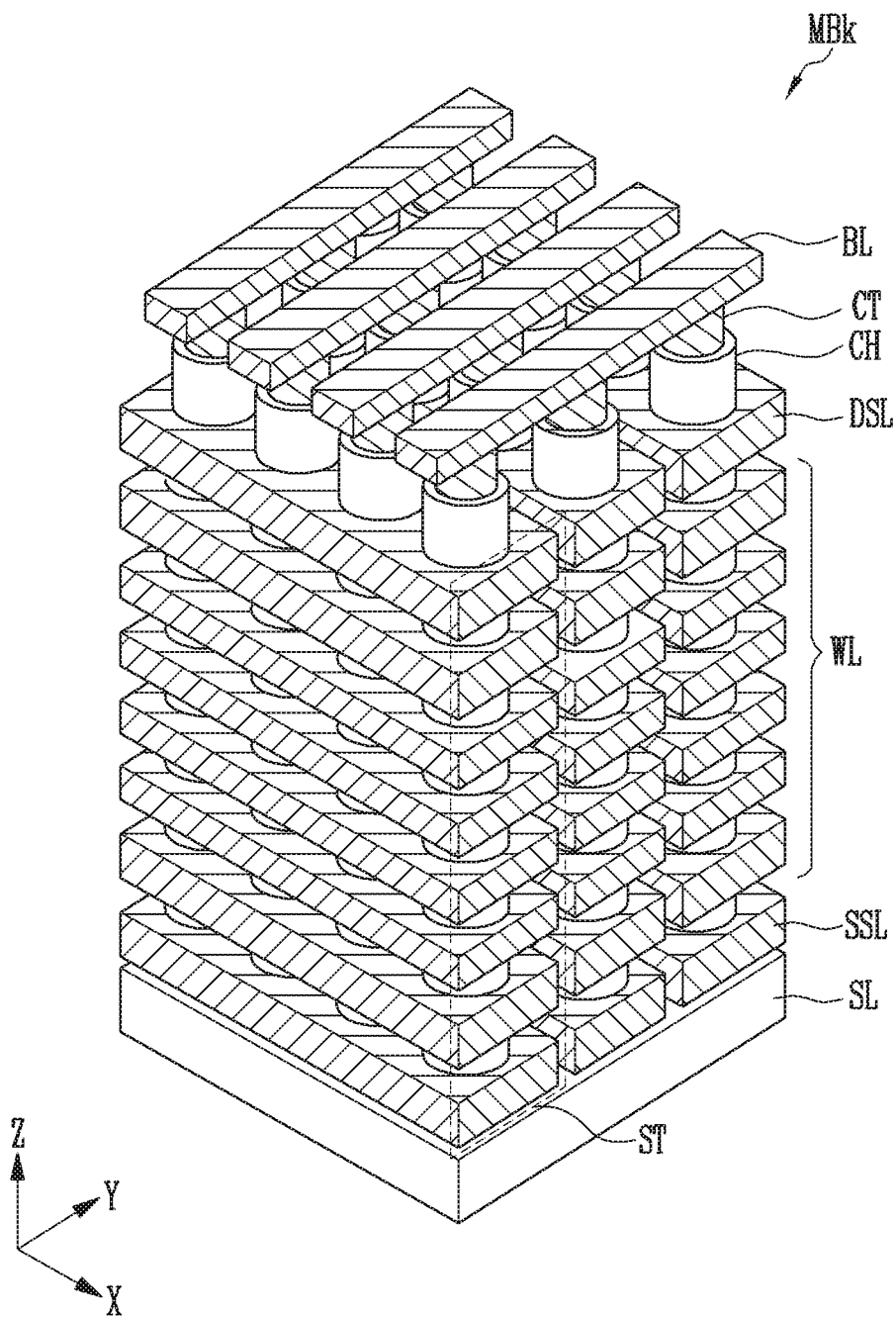
FIG. 6 is a diagram illustrating an example of a memory block having a 3D structure.

FIG. 6 is a diagram illustrating an example of a memory block having a 3D structure.

For convenience, any one memory block MBk of a plurality of memory blocks MB1 to MBk included in a memory cell array 3240 described in FIG. 4 is illustrated in FIG. 6.

Referring to FIG. 6, the memory block MBk having a 3D structure may be formed on a substrate in an I-shape in a direction vertical to the substrate (i.e., a Z direction). The memory block MBk may include a plurality of cell strings ST arranged between bit lines BL and a source line SL. In an embodiment, a well may be formed instead of the source line SL. This structure may be called a "Bit Cost Scalable (BiCS) structure". For example, in a case where the source line SL is horizontally formed on the substrate, cell strings ST having a BiCS structure may be formed on the source line SL in the direction vertical to the substrate (i.e., the Z-direction).

In detail, the cell strings ST may be individually arranged in a first direction (i.e., an X-direction) and in a second direction (i.e., a Y-direction). The cell strings ST may include source select lines SSL, word lines WL, and drain select lines DSL which are stacked while being spaced apart from each other. The number of source select lines SSL, the number of word lines WL, and the number of drain select lines DSL are not limited to those illustrated in the drawing, and may vary according to the embodiment. The cell strings ST may include vertical channel layers CH and bit lines BL. The vertical channel layers CH may be formed to vertically pass through the source select lines SSL, the word lines WL, and the drain select lines DSL. The bit lines BL may come into contact with the tops of the vertical channel layers CH that protrude upwardly from the drain select lines DSL, and may be extended in the second direction (i.e., the Y direction). The memory cells may be formed between the word lines WL and the vertical channel layers CH. Contact plugs CT may be further formed between the bit lines BL and the vertical channel layers CH.

Figure 7:
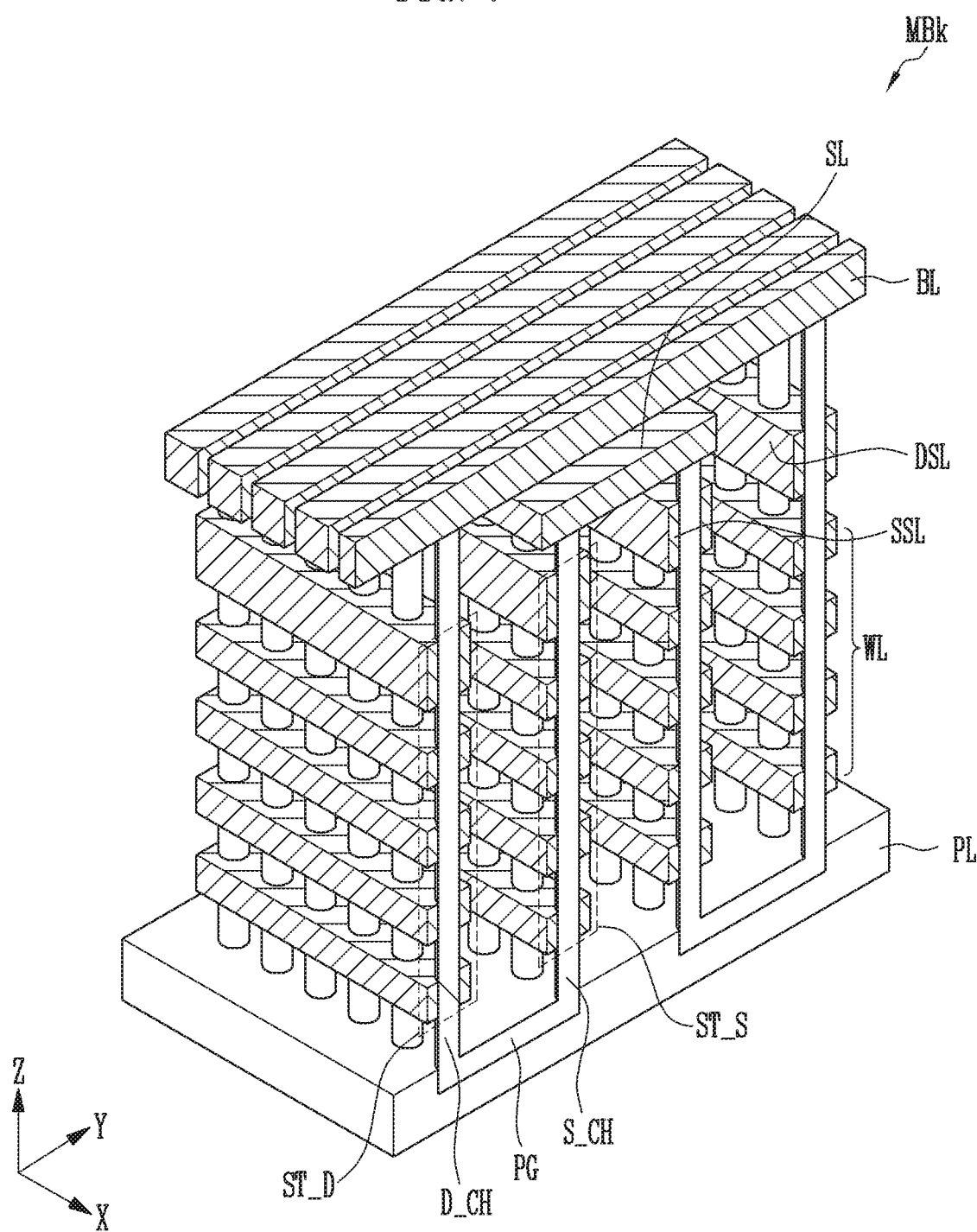
FIG. 7 is a diagram illustrating an example of a memory block having a 3D structure.

FIG. 7 is a diagram illustrating an example of a memory block having a 3D structure.

For convenience, any one memory block MBk of a plurality of memory blocks included in a memory cell array is illustrated in FIG. 7.

Referring to FIG. 7, the memory block MBk having a 3D structure may be formed on a substrate in a U-shape in a direction vertical to the substrate (i.e., a Z-direction). The memory block MBk may include source strings ST_S and drain strings ST_D which are coupled between bit lines BL and a source line SL and which form pairs. Each source string ST_S and the corresponding drain string ST_D may be coupled to each other through a pipe gate PG to form a U-shape. The pipe gate PG may be formed in a pipeline PL. In more detail, the source strings ST_S may be formed to be vertical to the substrate between source lines SL and the pipeline PL, and the drain strings ST_D may be formed to be vertical to the substrate between the bit lines BL and the pipeline PL. This structure may be called a "Pipe-shaped Bit Cost Scalable (P-BiCS) structure."

In detail, the drain strings ST_D and the source strings ST_S may be individually arranged in a first direction (i.e., an X-direction) and in a second direction (i.e., a Y-direction). The drain strings ST_D and the source strings ST_S may be alternately arranged along the second direction (i.e., the Y-direction). Each of the drain strings ST_D may include word lines WL and a drain select line DSL which are stacked while being spaced apart from each other. Each of the drain strings ST_D may include a drain vertical channel layer D_CH formed to vertically pass through the word lines WL and the drain select line DSL. Each of the source strings ST_S may include word lines WL and a source select line SSL which are stacked while being spaced apart from each other. Each of the source strings ST_S may include a source vertical channel layer S_CH formed to vertically pass through the word lines WL and the source select line SSL. The drain vertical channel layers D_CH and the source vertical channel layers S_CH may be coupled to each other via corresponding pipe gates PG in the pipeline PL. The bit lines BL may come into contact with the tops of the drain vertical channel layers D_CH that protrude upwardly from the drain select lines DSL, and may be extended in the second direction (i.e., the Y-direction).

FIG. 8 is a flowchart illustrating a method of controlling the operation of a memory device according to an embodiment of the present disclosure.

An embodiment to be described with reference to FIG. 8 may be applied to the memory system, described above with reference to FIGS. 1A to 7.

At step 801, an operating environment determiner, for example, 3120a of FIG. 1B or 3120b of FIG. 2B may receive at least one piece of surrounding environment-sensing data. The surrounding environment-sensing data may include environmental data collected from the periphery of the memory system. In various embodiments, the surrounding environment-sensing data may include at least one of temperature data, speed data, and vibration data. The surrounding environment-sensing data may be received either periodically or when an event occurs. The surrounding environment-sensing data may be directly received from an environmental sensor which collects surrounding environment-sensing data as shown in FIG. 2B, or may be received through a host as shown in FIG. 1B.

At step 803, the operating environment determiner may determine the operating environment of the memory device, for example, 3200a of FIG. 1B or 3200b of FIG. 2B based on the received surrounding environment-sensing data. The operating environment determiner may determine the operating environment of a current time of the memory device by comparing currently received surrounding environment-sensing data with a set value. The operating environment determiner may also determine the operating environment of a subsequent (i.e., future) time of the memory device by comparing the currently received surrounding environment-sensing data with previously received surrounding environment-sensing data. The operating environment determiner may manage a first table that is used to determine the operating environment of the memory device. The operating environment determiner may transmit information about the determined operating environment to a central processing unit (CPU), for example, 3130a of FIG. 1B or 3130b of FIG. 2B.

At step 805, the CPU may check operating characteristics of the memory device that are required in the determined operating environment. The required operating characteristics may be related to the degree to which data reliability is to be guaranteed or permitted, or the degree to which an operating speed is to be guaranteed or permitted when the memory device performs an operation. The CPU may manage a second table that is used to check the required operating characteristics. For example, the second table may be stored in a static random access memory (SRAM), for example, 3170a of FIG. 1B or 3170b of FIG. 2B, and the CPU may manage the second table stored in the SRAM.

At step 807, the CPU may select a policy required to achieve the checked operating characteristics. The policy may prescribe operating conditions corresponding to the required operating characteristics. The CPU may manage a policy table that is used to select the policy. The policy table may be a table in which at least one policy required to achieve the checked operating characteristics is mapped to the operating characteristics. The policy may include policies related to a program mode, a program technique, a read voltage, whether to perform data compression, and whether to perform a copy-back operation.

At step 809, the CPU may control the operation of the memory device based on the selected policy. The CPU may generate a command and an address used to control the operation of the memory device based on the selected policy, and may transmit the generated command and address to the memory device.

FIGS. 9A to 9C are diagrams for explaining tables according to an embodiment of the present disclosure.

In FIG. 9A, an example of a first table used to determine the operating environment of a memory device, for example, 3200 of FIG. 4, is illustrated.

Referring to FIG. 9A, in the first table, the results of analysis of surrounding environment-sensing data may be mapped to the operating environments of the memory device. For example, in the first table, speed data of the surrounding environment-sensing data and information for determining an operating environment corresponding thereto may be stored. For example, when a current speed is greater than a set speed value, a policy (or a code) corresponding to a first operating environment may be selected, whereas when the current speed is less than or equal to the set speed value, a policy (or a code) corresponding to a second operating environment may be selected.

In FIG. 9B, an example of a second table used to check required operating characteristics of a memory device, for example, 3200 of FIG. 4, is illustrated.

Referring to FIG. 9B, in the second table, determined operating environments may be mapped to required operating characteristics. For example, operating characteristics required depending on environmental characteristics and pieces of information about the operating speeds of the memory device corresponding to the operating characteristics may be stored in the second table. For example, in a first operating environment, a high operating speed may be required, whereas in a second operating environment, a low operating speed may be required. Therefore, by means of the second table, a policy (or a code) corresponding to the high operating speed may be selected in the first operating environment, whereas a policy (or a code) corresponding to the low operating speed may be selected in the second operating environment. The requirement of the high operating speed may mean that an operating speed higher than a set value is required, or may mean that an operating speed higher than that in other operating environments is required.

In FIG. 9C, an example of a policy table used to select a policy for a memory device, for example, 3200 of FIG. 4, is illustrated.

Referring to FIG. 9C, in the policy table, at least one policy corresponding to required operating characteristics may be mapped to the operating characteristics. For example, in the policy table, policy information related to a program mode, a program technique, a read voltage, whether to perform data compression, and whether to perform a copy-back operation may be stored. For example, when a high operating speed is required, a policy (or a code) may be selected and outputted which indicates that an SLC mode, a large step voltage, a high program start voltage, and a default read voltage are applied, and that data compression and a copy-back operation are not to be performed. When a low operating speed is required, a policy (or a code) may be selected and outputted which Indicates that a MLC mode, a small step voltage, a low program start voltage, and a default read voltage are applied, and that data compression and a copy-back operation are to be performed. When a policy is selected, only one of a plurality of prescribed policies may be selected, or two or more policies may be selected.

FIG. 10 is a diagram illustrating a memory device to which policies on different program modes are applied according to an embodiment of the present disclosure.

Referring to FIG. 10, a memory system may include a plurality of memory devices 1 to N.

The first to M-th memory devices 1 to M may operate in an SLC mode (hereinafter referred to as "SLC memory devices"). The (M+1)-th to N-th memory devices M+1 to N may operate in an MLC mode (hereinafter referred to as "MLC memory devices").

If an SLC mode policy is selected, SLC memory devices may be selected. On the selected SLC memory devices, a program operation, a read operation or an erase operation may be performed.

If an MLC mode policy is selected, MLC memory devices may be selected. On the selected MLC memory devices, a program operation, a read operation or an erase operation may be performed.

Figure 11A:
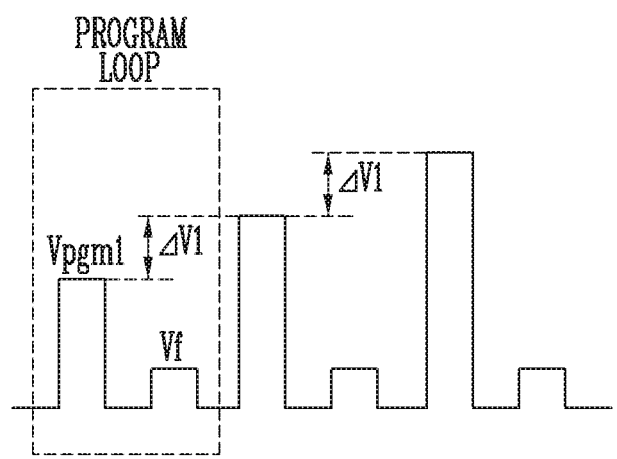
FIGS. 11A to 11C are diagrams illustrating a program method to which different policies are applied according to an embodiment of the present disclosure.
Figure 11B:
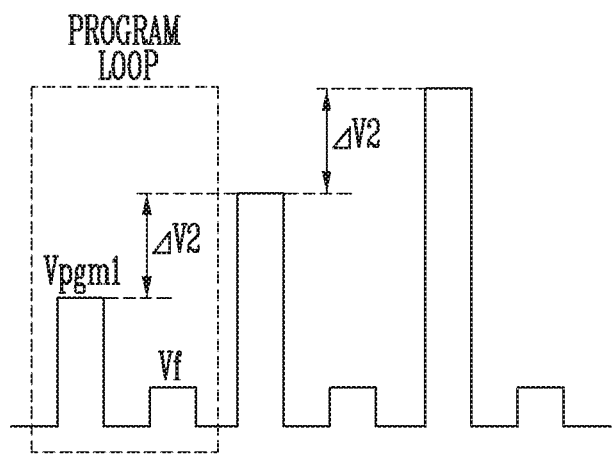
Figure 11C:
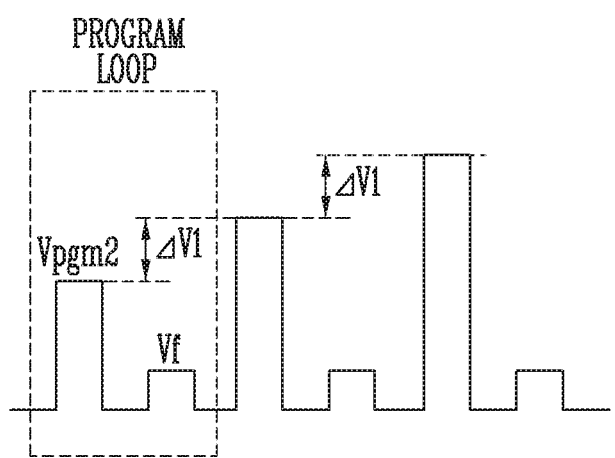

FIGS. 11A to 11C are example diagrams for explaining cases where policies on different program techniques are applied according to an embodiment of the present disclosure. For illustration, examples of the case where a policy on an incremental step pulse programming (ISPP) technique is applied are shown.

In FIG. 11A, an example in which the values of all variables used in the ISPP technique are default values is illustrated. The step of applying a program voltage to a selected word line coupled to a selected page and the step of applying a verify voltage Vf to the selected word line may configure a single program loop. A program voltage used in the first program loop may be defined as a first program start voltage Vpgm1. Whenever a program loop is repeated, the program voltage is increased by a first step voltage $\Delta V1$, and the threshold voltages of selected memory cells coupled to the selected page may be increased due to the increased program voltage.

In FIG. 11B, an example of a case where a policy for Increasing a step voltage is selected is illustrated. Whenever a program loop is repeated, a program voltage is increased by a second step voltage $\Delta V2$, and a program operation using the increased program voltage may be performed. Here, the second step voltage $\Delta V2$ may be a step voltage greater than the first step voltage $\Delta V1$, which is a default step voltage described above with reference to FIG. 11A.

In FIG. 11C, an example of a case where a policy for increasing a program start voltage is selected is illustrated. In FIG. 11C, a program operation that uses a second program start voltage Vpgm2 greater than the first program start voltage Vpgm1, which is a default program start voltage described above with reference to FIG. 11A, may be performed.

FIG. 12 is a diagram for explaining a case where policies on different read voltages are applied according to an embodiment of the present disclosure.

Referring to FIG. 12, during a multi-level cell (MLC)-type program operation, multiple bits of data may be stored in a single memory cell, and thus memory cells may be programmed in multiple program states. For example, the memory cells may each be in an erase state E0 or may be programmed to a first program state P1, a second program state P2 or a third program state P3.

In this way, as the number of bits stored in a single memory cell increases, a margin between the threshold voltages of memory cells may decrease, and a read voltage should be set in consideration of this margin in the read operation.

The read operation may be performed using a method of applying the read voltage to a selected word line and of sensing the voltages or currents of bit lines that are varied by memory cells turned on or turned off due to the read voltage. However, since the sensing voltages or currents may be varied according to the environmental change of the memory device (e.g., temperature change), the reliability of the read operation may be deteriorated.

Therefore, in the present embodiment, the read voltage, sensing voltages or sensing currents may be varied according to the environmental change. For example, when a default read voltage in the first program state P1 is set to a first read voltage Vr1, a second read voltage Vr2 lower than the first read voltage Vr1 may be set in an environment having a temperature lower than a room temperature, and a third read voltage Vr3 higher than the first read voltage Vr1 may be set in an environment having a temperature higher than the room temperature.

If a policy prescribing that the default read voltage is to be applied is selected, the first read voltage Vr1 may be set. If a policy prescribing that a read voltage lower than the default read voltage is to be applied is selected, the second read voltage Vr2 may be set. If a policy prescribing that a read voltage higher than the default read voltage is to be applied is selected, the third read voltage Vr3 may be set.

FIGS. 13A to 13C are example diagrams for explaining tables according to an embodiment of the present disclosure.

In FIGS. 13A to 13C, an example of a case where a plurality of types of surrounding environment-sensing data are used and a plurality of operating characteristics are required is illustrated.

In FIG. 13A, an example of a first table used to determine the operating environment of a memory device is illustrated, and the memory device may be disposed in an environment such as a vehicle. In the first table, the results of analysis of surrounding environment-sensing data may be mapped to the operating environments of the memory device. In FIG. 13A, a case where, among the surrounding environment-sensing data, speed data, vibration data, and temperature data of the vehicle in which the memory device is disposed are used to determine the operating environment of the memory device is illustrated by way of example. Also, in FIG. 13A, a case where previous speed data and current speed data are used to determine the operating environment of the memory device is illustrated by way of example.

Referring to FIG. 13A, when a current speed is equal to or greater than a previous speed, and a current external temperature is not a room temperature, the operating environment is defined as a first operating environment. The room temperature may signify a case where the current external temperature is equal to or greater than a first set external temperature value and is less than or equal to a second set external temperature value. The second set external temperature value may be a value higher than the first set external temperature value. For example, the first set external temperature value may be 10° C., and the second set external temperature value may be 30° C. In this case, a range from 10° C. to 30° C. may be regarded as a room temperature range, and a range of temperatures less than 10° C. or greater than 30° C. may be regarded as a temperature range other than the room temperature. Therefore, the first operating environment of FIG. 13A may indicate a case where the current speed is equal to or greater than the previous speed, and the current external temperature is less than 10° C. or greater than 30° C. The range of the room temperature may be set differently according to the embodiment. Meanwhile, it can be seen that, when current vibration is greater than a set vibration value, and the current external temperature is not a room temperature, the operating environment is defined as a second operating environment. Meanwhile, it can be seen that, when the current speed is equal to or greater than the previous speed, and the current external temperature is a room temperature, the operating environment is defined as a third operating environment. Meanwhile, it can be seen that, when the current speed is 0 or is less than the previous speed, and the current vibration is less than or equal to a set vibration value, the operating environment is defined as a fourth operating environment.

In FIG. 13B, an example of a second table used to check required operating characteristics is illustrated. In the second table, determined operating environments may be mapped to required operating characteristics. In FIG. 13B, a case where required operating characteristics are related to data reliability and the operating speed of a memory device is illustrated by way of example. Referring to FIG. 13B, in a first operating environment, high data reliability and a high operating speed are required. In a second operating environment, high data reliability and a low operating speed are required. In a third operating environment, low data reliability and a high operating speed are required. In a fourth operating environment, low data reliability and a low operating speed are required. The requirement of the high data reliability may mean that data reliability higher than a set value is required, or may mean that data reliability higher than that in other operating environments is required. The requirement of the high operating speed may mean that an operating speed higher than a set value is required, or may mean that an operating speed higher than that in other operating environments is required.

In FIG. 13C, an example of a policy table used to select a policy is illustrated. In the policy table, at least one policy corresponding to required operating characteristics may be mapped to the operating characteristics. In FIG. 13C, a case where policies related to a program mode, a program technique, a read voltage, whether to perform data compression, and whether to perform a copy-back operation are prescribed is illustrated by way of example. Referring to FIG. 13C, when high data reliability and a high operating speed are required, a policy prescribing that a single-level cell (SLC) mode, a low step voltage, a small number of program loops, and a default read voltage are to be applied and that data compression and a copy-back operation are not to be performed is mapped to the required operating characteristics. When high data reliability and a low operating speed are required, a small step voltage, a large number of program loops, and a changed read voltage are to be applied and that data compression and a copy-back operation are to be performed is mapped to the required operating characteristics. When low data reliability and a high operating speed are required, a large step voltage, a high program start voltage, a small number of program loops, and a default read voltage are to be applied and that data compression and a copy-back operation are not to be performed is mapped to the required operating characteristics. When low data reliability and a low operating speed are required, a large step voltage, a high program start voltage, a large number of program loops, and a default read voltage are to be applied and that data compression and a copy-back operation are to be performed is mapped to the required operating characteristics.

In the policy table, a policy for applying a program mode in which each cell has a smaller number of information bits as higher data reliability is required may be prescribed. Further, a policy for applying a program mode in which each cell has a smaller number of information bits as a higher operating speed is required may be prescribed.

In accordance with an embodiment, a policy for applying a program mode in consideration of the required data reliability and the required operating speed may be prescribed. For example, a policy may be prescribed such that, when high data reliability and a high operating speed are required, a single-level cell (SLC) mode that is a program mode in which each cell has a smallest number of information bits is selected. When high data reliability and a low operating speed are required, a 2-bit multi-level cell (MLC) mode in which each cell has the next-smallest number of information bits is selected. When low data reliability and a low operating speed are required, a 4-bit MLC mode that is a program mode in which each cell has a largest number of information bits is selected. When low data reliability and a high operating speed are required, a 3-bit MLC mode in which each cell has the next-largest number of information bits is selected.

Further, in the policy table, various policies related to the variable values of program techniques, whether to change a read voltage, whether to perform data compression, and whether to perform a copy-back operation may be prescribed depending on the required operating characteristics.

Figure 14:
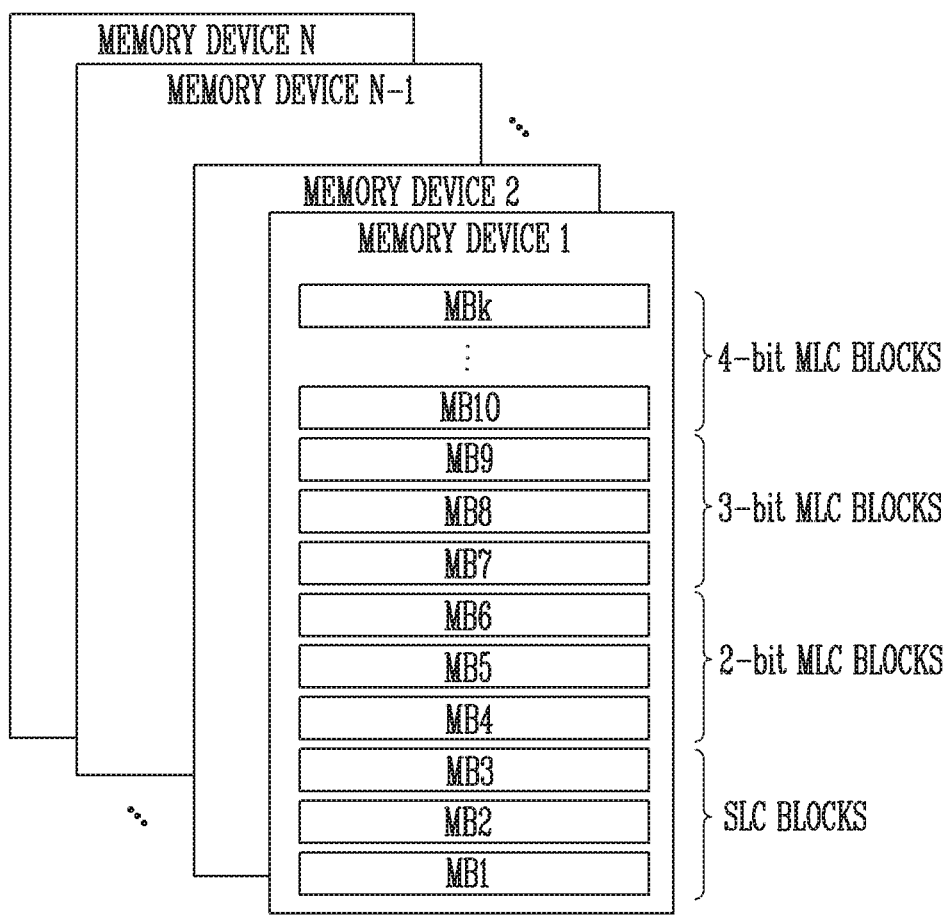
FIG. 14 is a diagram illustrating a memory device to which policies on different program modes are applied according to an embodiment of the present disclosure.

FIG. 14 is a diagram illustrating a memory device to which policies on different program modes are applied according to an embodiment of the present disclosure.

Referring to FIG. 14, a memory system may include a plurality of memory devices 1 to N. Each of the plurality of memory devices may include memory blocks operating in a single-level cell (SLC) mode (i.e., SLC BLOCKS), memory blocks operating in a 2-bit multi-level cell (MLC) mode (i.e., 2-bit MLC BLOCKS), memory blocks operating in a 3-bit MLC mode (i.e., 3-bit MLC BLOCKS), and memory blocks operating in a 4-bit MLC mode (i.e., 4-bit MLC BLOCKS). The memory blocks operating in the 3-bit MLC mode (i.e., 3-bit MLC BLOCKS) may be TLC memory blocks, and the memory blocks operating in the 4-bit MLC mode may be QLC memory blocks. When a policy for prescribing that memory blocks are to be operated in the SLC mode is selected, an operation to be performed on the SLC blocks, for example, a program operation, a read operation or an erase operation, may be performed.

When a policy for prescribing that memory blocks are to be operated in the 2-bit MLC mode is selected, an operation to be performed on the 2-bit MLC blocks, for example, a program operation, a read operation or an erase operation, may be performed.

When a policy for prescribing that memory blocks are to be operated in the 3-bit MLC mode is selected, an operation to be performed on the 3-bit MLC blocks, for example, a program operation, a read operation or an erase operation, may be performed.

When a policy for prescribing that memory blocks are to be operated in the 4-bit MLC mode is selected, an operation to be performed on the 4-bit MLC blocks, for example, a program operation, a read operation or an erase operation, may be performed.

In accordance with the present disclosure, a memory system may be controlled in consideration of an environment in which a memory device is operated, and thus the reliability of the memory system may be improved.

While the exemplary embodiments of the present disclosure have been disclosed for illustrative purposes, those skilled in the art will appreciate that various modifications, additions and substitutions are possible. Therefore, the scope of the present disclosure must be defined by the appended claims and equivalents of the claims rather than by the description preceding them.

What is claimed is:

1. A memory controller, comprising:
an operating environment determiner configured to determine an operating environment of a memory device based on at least one of surrounding environment-sensing data; and
a central processing unit (CPU) configured to determine operating characteristics of the memory device required in the determined operating environment, select a policy depending on the determined operating characteristics, and control an operation of the memory device based on the selected policy,
wherein the surrounding environment-sensing data includes vibration data or speed data of a vehicle in which the memory device is included, and
wherein the CPU adjusts at least one of a step voltage, a program start voltage, and a number of program loops used for a program operation of the memory device based on the determined operating environment.

2. The memory controller according to claim 1, wherein the surrounding environment-sensing data further comprises temperature data of the vehicle in which the memory device is included.

3. The memory controller according to claim 1, wherein the operating environment determiner is configured to determine an operating environment of a current time of the memory device by comparing currently measured surrounding environment-sensing data with a set value.

4. The memory controller according to claim 3, wherein the set value includes a value measured prior to the currently measured surrounding environment-sensing data, or a value set to a default value.

5. The memory controller according to claim 1, wherein the operating environment determiner is configured to determine an operating environment of a subsequent time of the memory device by comparing currently measured surrounding environment-sensing data with previously measured surrounding environment-sensing data.

6. The memory controller according to claim 1, wherein the operating characteristics include characteristics related to reliability of data to be stored in the memory device or an operating speed of the memory device.

7. The memory controller according to claim 1, wherein the CPU is configured to determine a program mode to be applied to the memory device among a single-level cell (SLC) mode and a multi-level cell (MLC) mode based on the policy.

8. The memory controller according to claim 7, wherein the CPU is configured to control the program operation of the memory device based on a policy for decreasing a number of bits that are stored per memory cell as a higher operating speed is required.

9. The memory controller according to claim 7, wherein the CPU is configured to control the program operation of the memory device based on a policy for decreasing a number of bits that are stored per memory cell as higher data reliability is required.

10. The memory controller according to claim 1, wherein the CPU is configured to determine whether to change a read voltage, whether to perform data compression, or whether to perform a copy-back operation, based on the policy.

11. A memory system, comprising:
a memory device configured to store or output data; and
a memory controller configured to determine an operating environment of the memory device based on at least one of surrounding environment-sensing data, determine operating characteristics of the memory device required in the determined operating environment, select a policy depending on the determined operating characteristics, and control an operation of the memory device based on the selected policy,
wherein the surrounding environment-sensing data includes vibration data or speed data of a vehicle in which the memory device is included, and
wherein the memory controller adjusts at least one of a step voltage, a program start voltage, and a number of program loops used for a program operation of the memory device based on the determined operating environment.

12. The memory system according to claim 11, wherein the surrounding environment-sensing data further comprises temperature data of the vehicle in which the memory device is included.

13. The memory system according to claim 11, wherein the memory controller is configured to determine a program mode to be applied to the memory device among a single-level cell (SLC) mode and a multi-level cell (MLC) mode based on the policy.

14. The memory system according to claim 11, wherein the memory controller is configured to determine whether to change a read voltage, whether to perform data compression, or whether to perform a copy-back operation, based on the policy.

15. A method of operating a memory controller, comprising:
determining an operating environment of a memory device based on surrounding environment-sensing data of the memory device;
determining operating characteristics of the memory device required in the determined operating environment;
selecting a policy required to achieve the determined operating characteristics; and
adjusting at least one of a step voltage, a program start voltage, and a number of program loops used for a program operation of the memory device based on the selected policy,
wherein the surrounding environment-sensing data includes vibration data or speed data of a vehicle in which the memory device is included.

* * * * *